US011379838B2

(12) United States Patent
Shum et al.

(10) Patent No.: US 11,379,838 B2
(45) Date of Patent: Jul. 5, 2022

(54) VIRTUALIZATION OF USER AND DATA SOURCE IDENTIFICATION

(71) Applicant: Hong Kong Applied Science and Technology Research Institute Co., Ltd., Shatin (HK)

(72) Inventors: Kam Hong Shum, Taikoo Shing (HK); Chi-Kwong Hui, South Horizons (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 219 days.

(21) Appl. No.: 16/782,550

(22) Filed: Feb. 5, 2020

(65) Prior Publication Data

US 2021/0241274 A1     Aug. 5, 2021

(51) Int. Cl.
*G06Q 20/40* (2012.01)
*G06Q 20/02* (2012.01)
(Continued)

(52) U.S. Cl.
CPC ......... *G06Q 20/4012* (2013.01); *G06Q 20/02* (2013.01); *G06Q 20/383* (2013.01);
(Continued)

(58) Field of Classification Search
CPC .. G06Q 20/4012; G06Q 20/02; G06Q 20/383; G06Q 20/389; G06Q 20/38215;
(Continued)

(56) References Cited

U.S. PATENT DOCUMENTS 7,996,888 B2   8/2011  Asunmaa et al.
8,549,597 B1  10/2013  Strand
(Continued)

FOREIGN PATENT DOCUMENTS

CN    108694668 A    10/2018
CN    110414961 A    11/2019

OTHER PUBLICATIONS

Patent Cooperation Treaty, International Search Report and Written Opinion issued for PCT Application No. PCT/CN2020/075157, dated Nov. 2, 2020, 9 pages.

*Primary Examiner* — Patrick McAtee
*Assistant Examiner* — Vincent I Idiake
(74) *Attorney, Agent, or Firm* — Norton Rose Fulbright US LLP

(57) ABSTRACT

The present invention includes systems and method for generating Virtual IDs (VIDs) and corresponding Virtual ID Chains (VICs) to anonymize and represent transactions between users, data sources, Virtual ID Management Platforms (VMP), and Third-Party Service Providers (TSPs). VIDs of embodiments are virtualized identifiers that may be used to anonymously and uniquely identify transaction participants. VIDs may be generated in a distributed manner as a party receiving transaction-related information generates a VID corresponding to the sending party. VICs of embodiments are virtualized arrays of VIDs that represent the sequence of interactions between parties to a transaction. VICs are preferably stored in association with transaction logs descriptive of the transaction represented by each VIC to facilitate subsequent processing. A VIC may be iteratively resolved to obtain one or more non-virtualized identifier corresponding to transaction participants represented by the VIC.

22 Claims, 5 Drawing Sheets

(51) Int. Cl.
*G06Q 20/38* (2012.01)
*H04L 9/08* (2006.01)

(52) U.S. Cl.
CPC ......... *G06Q 20/389* (2013.01); *H04L 9/0866* (2013.01); *H04L 2209/56* (2013.01)

(58) Field of Classification Search
CPC . G06Q 20/385; H04L 9/0866; H04L 2209/56; H04L 63/101; H04L 63/0435; H04L 63/08; H04L 63/0421
See application file for complete search history.

(56) References Cited

U.S. PATENT DOCUMENTS

| | | | |
|---|---|---|---|
| 10,142,378 | B2 | 11/2018 | Koeten et al. |
| 10,171,476 | B2 | 1/2019 | Khan |
| 11,157,954 | B1* | 10/2021 | Belanger ............ G06Q 30/0201 |
| 2007/0208845 | A1 | 9/2007 | Raheman et al. |
| 2009/0164313 | A1 | 6/2009 | Jones et al. |
| 2013/0268644 | A1 | 10/2013 | Hardin et al. |
| 2014/0129447 | A1* | 5/2014 | Ranalli ................ G06Q 20/29 |
| | | | 705/44 |
| 2018/0101848 | A1 | 4/2018 | Castagna |
| 2021/0034571 | A1* | 2/2021 | Bedadala ............. G06F 16/134 |
| 2021/0320922 | A1* | 10/2021 | Furhmann ............. H04L 9/3213 |

* cited by examiner

| | Column 1 | Column 2 |
|---|---|---|
| | User ID (UID) | Virtual User ID (VUID) |
| row1 → | UID1 | VUID1, VUID3, VUID7... |
| row2 → | UID2 | VUID2, VUID5, VUID9... |
| row3 → | UID3 | VUID4, VUID6, VUID8... |
| ... | ... | ... |
| rowN → | UIDN | $VUID_x$, $VUID_y$, $VUID_z$ |

FIG. 2A

VIRTUALIZATION OF USER AND DATA SOURCE IDENTIFICATION

TECHNICAL FIELD

The present invention relates generally to permission-based identity management and, more particularly, to traceable, virtual identity chains that anonymize the identity of parties associated with a transaction.

BACKGROUND OF THE INVENTION

Open data principles posit that data should be freely available for everyone to use and republish, without restriction. There have been recent pushes to apply open data principles to how an individual's personal data may be shared among different enterprises to drive cross-industry business models by profiling individuals (e.g., summarize habits, lifestyle, income level, preferences, demographics, and psychographics and behavior patterns, etc.). Additionally, open data applications may allow Third-Party Service Providers (TSPs) (e.g., an individual, entity, organization, agency, or the like providing a product and/or service) to meet the personalized needs of a user (e.g., an individual, organization, entity, computing device, business, etc. engaging in transactions with TSPs). For example, a user's purchasing history may provide cross-business benefits for TSPs in complimentary markets. Open data infrastructures may also facilitate improved services between insurance carriers and medical services providers, banking institutions and merchants, transportation and hospitality providers, government agencies and private sector partners, and other like synergistic relationships.

However, countervailing principles of data privacy are also major concerns when sharing data. For example, the European Union's General Data Protection Regulation (GDPR) gives control to individuals over their personal data (e.g. Internet activity, medical, personal identity, financial, political, etc.) and contains requirements for processing and protecting the same. Other sovereignties have also implemented data privacy laws regulations, such as the California Consumer Privacy Act, the Russian Federal Law on Personal Data (Russian Federation), and the Data Protection Act 2018 (United Kingdom). These data protection frameworks may also include data sovereignty principles, which restrict the transfer of personal data outside of a particular country or territory absent adequate protection of personal data.

There are therefore certain inherent conflicts between: (i) the goal of TSPs to maximize the value of data and their duties to respect individual's privacy preferences with respect to their personally identifiable information; and (ii) the goals of individuals to both protect their privacy rights and benefiting from personalized services. For example, a TSP's ability to retain a consumer's personal data for later profiling may be limited due to the issues of data ownership and privacy.

BRIEF SUMMARY OF THE INVENTION

The present invention is directed to systems and methods that provide traceable, virtual identifiers to anonymize the identity of parties involved in a transaction. According to embodiments, a user may engage in transactions with one or more TSPs. For example, the user may seek to purchase a product from a merchant. In another example, the TSP may be a hospital providing medical services to the user. To facilitate such transactions, the user may rely on one or more data sources having information associated with the user and relevant to the transaction, such as a bank or insurance carrier with respect to the above examples. Data sources such as financial services, utilities services, government services, and the like may separately or jointly possess information associated with the user (e.g., account information, national identifier, etc.) that the user relies on to engage in transactions with TSPs.

In operation according to embodiments, information related to the transaction and identifying the user, data source(s), and/or TSP may be exchanged over a communication path between the parties to facilitate the transaction. For example, to complete a purchase transaction, a user may provide his or her bank with a user identifier (e.g., an account number), a merchant identifier associated with the TSP, and transaction-related information such as an amount of payment. Such information may also be recorded for subsequent processing. For example, a TSP may use past transaction records to profile a user. In another example, a TSP may seek payment settlement from a bank identified by a user for goods and/or services provided to the user. In yet another example, a user may rely on his or her transaction records to satisfy eligibility requirements to receive services from or to obtain discounts with a TSP.

Identifying information exchanged and recorded according to embodiments is preferably anonymized to protect the identities of the parties to a transaction (e.g., user, data source(s), TSP, etc.). Virtual ID Management Platforms (VMP) of embodiments may provide communication routing (e.g., TCP/IP routing, Application Programming Interface (API) routing, etc.) and anonymization services for transaction participants (e.g., users, data sources, and TSPs). In operation according to embodiments of the invention, the personal data (e.g., names, account identifiers, government identification, other identifiers, or combinations thereof) of users and data sources (e.g., entities, organizations, computing systems, etc. possessing information associated with users) involved in a transaction for goods and/or services with a TSP may be anonymized using virtualized identifiers (e.g., Virtual IDs or VIDs). Methods and systems in accordance with concepts of the present invention achieve personalized, permission-based data sharing and profiling while also ensuring that that identities are anonymized against disclosure, thereby balancing principles of data privacy and free information flow. For example, embodiments of the invention facilitate permission-based consumer profiling using virtualized identifiers while limiting the disclosure of non-virtualized identifiers.

Embodiments of the present invention utilize VIDs to anonymize identifiers (e.g., names, biometrics, account information, address information, other suitable forms of identification, or combinations thereof) associated with users and any parties (e.g., nodes along a communication path between a user and a TSP) that are shared to facilitate a transaction. A VID of embodiments is a virtualized identifier (e.g., uniquely-assigned identifier, cryptogram, digital signature, etc.) that anonymously and uniquely identifies a party (e.g., user, data source, TSP) involved in a transaction. Such VIDs may be used for a number of purposes without the need for disclosing non-virtualized identifiers associated with the parties to a transaction (e.g., users, data sources, etc.). For example, a user may rely on a bank as a data source and identify the same to an online merchant (e.g., a TSP) to complete a purchase transaction. In another example, the user may rely on a property title company as a data source and identify the same to a utility service (e.g., electricity, gas, broadband, etc.) to activate services at a residential property.

VIDs of embodiments may be generated by a recipient of identify information on behalf a sender of such information. For example, one or more Virtual ID Management Platforms (VMPs) may be adapted to receive identity information (e.g., non-virtualized identifiers) corresponding to parties involved in a transaction (e.g., users, data sources, TSPs, etc.), anonymize such identifiers by generating VIDs, and facilitate transaction processing and permission-based profiling using the VIDs. In another example, a data source, such as a bank, may receive a user's non-virtualized identifier and consent to share the same, and the data source may anonymize the user's identifier in a VID.

As identifiers are shared along a communication path originating at the user and terminating at a TSP, a node (e.g., a distinct party in the communication path such as the user, data source, VMP, TSP) receiving identifiers (e.g., virtualized and/or non-virtualized) preferably anonymizes the identifier associated with and received from a preceding, sending node. For example, a data source, such as a bank, may receive a non-virtualized identifier (e.g., name, account number, biometrics, etc.) corresponding to a user (e.g., user ID or UID) using the bank in a transaction, and the bank may generate a virtualized identifier corresponding to the user (e.g., a virtual user ID or VUID). In another example, a VMP may receive a non-virtualized identifier corresponding to a data source (e.g., data source ID or SID), such as an insurance carrier, when facilitating a transaction between the data source and a TSP, such as a hospital, and the VMP may generate a virtualized identifier corresponding to the data source (e.g., virtual source ID or VSID). In this way, a new VID may be generated at each layer of interaction between nodes in the communication path.

Embodiments of the present invention further involve the creation of traceable, virtual identity chains (e.g., Virtual ID Chains or VICs) by combining (e.g., delimited format, cryptographic, hash function, etc.) VIDs corresponding to at least two parties (e.g., any two of a user device, a data source, a VMP, etc.) involved in a transaction. VICs of embodiments are arrays of VIDs that represent the sequence of interactions between parties involved in a transaction as identifiers are shared between various nodes (e.g., a recipient and/or sender of identity information, such as a user device, a data source, a VMP, etc.) along a communication path in an open data environment. In operation according to embodiments, VICs may be iteratively generated by intermediary VMPs and/or data source(s) (e.g., collectively, nodes) along a communication path, with each node of the communication path virtualizing an identifier corresponding to a preceding node. VICs of embodiments may be iteratively resolved to obtain one or more non-virtualized identifiers corresponding to one or more nodes represented in the VIC and ultimately a non-virtualized identifier corresponding to a specific user.

For example, VIC=[VUID, VSID, VVMPID$_1$ . . . VVMPID$_r$] represents a sequence of virtualized identifiers (e.g., VIDs) corresponding to a user (e.g., VUID), a data source (e.g., VSID), and r VMPs (e.g., VVMPID). In another example, VIC=[VUID, VVMPID$_1$, VSID, VVMPID$_2$ . . . VVMPID$_r$] represents another sequence of virtual identities corresponding to a user (e.g., VUID), a first VMP (e.g., VVMPID$_1$), a data source (e.g., VSID), and r−1 subsequent VMPs (e.g., VVMPID$_2$ . . . VVMPID$_r$). VICs of embodiments preferably do not contain non-virtualized identifying attributes associated with parties involved in a transaction.

As such, VICs provide a roadmap for identifying anonymized user and data sources by unrolling (e.g., iteratively resolving) VIDs based on the structural relationship between nodes.

A VIC of embodiments may be stored (e.g., recorded, cataloged, etc.) by parties involved in a transaction in association with a transaction log describing the details of each transaction. An infrastructure utilizing such VIC records may facilitate dynamic, distributed control and anonymization of user and data source identities without the need for a centralized identity authority. The VICs and associated transaction logs may be used to perform personalized data processing, sharing, and profiling without disclosing the identities of individuals and/or data sources, thereby mitigating any security risk from exposing the same. Such VIC processing (e.g., attribute profiling, transaction settlement, etc.) is preferably predicated on consent by or permissions granted by users and/or data sources. In this way, TSPs may be empowered to perform permission-based profiling on transaction logs linked by virtualized identifiers (e.g., VIDs and/or VICs). Users would also be empowered to benefit from their personal data (e.g., personalized marketing, improved data sharing, etc.) without risking identity exposure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

FIGS. 2A-2B are exemplary data records of VIDs and VICs in accordance with embodiments of the present invention;

DETAILED DESCRIPTION OF THE INVENTION

Figure 1:
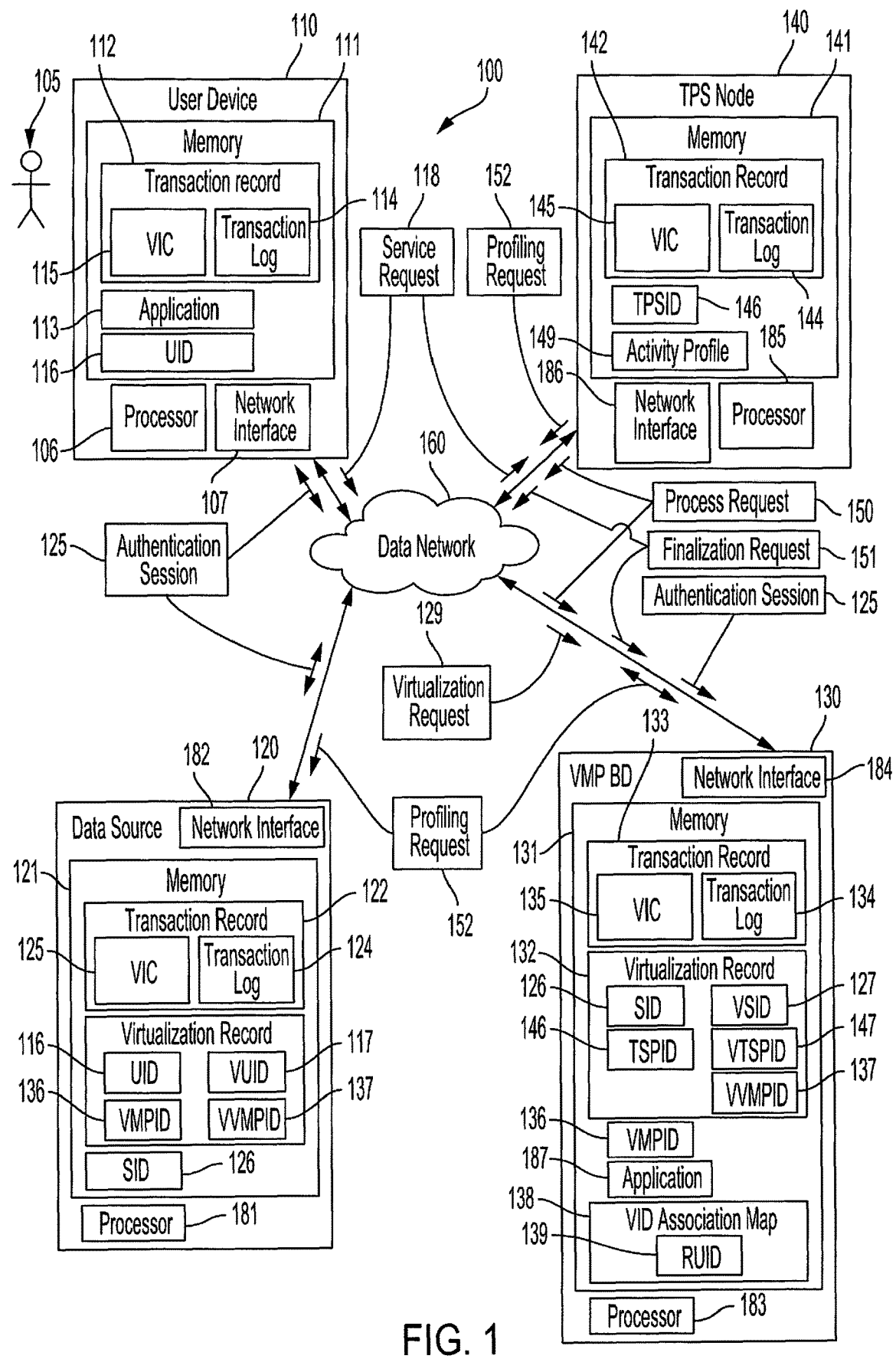
FIG. 1 illustrates a block diagram of a system for generating a Virtual ID Chain for virtualizing identities in an activity log in accordance with embodiments of the present invention.

Referring to FIG. 1, an embodiment of a system for virtualizing the identity of parties involved in a transaction and resolving the same is shown as system 100. As shown in FIG. 1, system 100 includes user device 110, data source 120, VMP 130, and TSP node 140. User device 110, data source 120, VMP 130, and TSP node 140 may be communicatively coupled to one another via data network 160. For example, VMP 130 may use one or more Application Programming Interfaces (API) to interact with user device 110, data source 120, and TSP node 140 over data network 160.

According to embodiments, data network 160 includes one or more communication networks for facilitating communication between user device 110, data source 120, VMP 130, and TSP node 140. Data network 160 may include wired networks, wireless networks, public networks (e.g., the Internet), private networks (e.g., local area networks (LANs), wide area networks (WANs), etc.), cellular broadband networks (e.g. LTE, CDMA200, EDGE, 5G wireless, etc.), Wi-Fi networks, other network infrastructures and topologies suitable for content delivery, or combinations thereof.

User device 110 of embodiments preferably includes processor 106, network interface 107, and memory 111. For example, user device 110 may include a mobile phone, personal computer, tablet, or similar device with a network interface adapted to facilitate communication with TSP node 140, data source 120, and/or VMP 130 on behalf of user 105 via data network 160. Processor 106 may include a single processor, or multiple processors, each of which may include a single processing core, multiple processing cores, or combinations thereof. In operation according to embodiments, processor 106 may be configured to perform the functions of user device 110 as described herein (e.g., initiate transactions, provide or revoke digital consent, etc.). Network interface 107 is preferably adapted to facilitate communication between user device 110 and data network 160 and may include, for example, a Bluetooth transceiver, cellular transceiver (e.g., 3G, 4G, 5G, etc.), Wi-Fi transceiver, or combinations thereof. According to embodiments, a communication path across data network 160, represented as a VIC as discussed herein, may originate at user device 110.

Memory 111 of embodiments may include random access memory (RAM) devices, read-only memory (ROM) devices, flash memory devices, other memory devices configured to store information in a persistent or non-persistent state and suitable for operations described herein, or combinations thereof. In operation according to embodiments, memory 111 may store instructions that, when executed by processor 106, cause processor 106 to perform functions in accordance with the concepts described herein. For example, a subset of the instructions stored in memory 111 may correspond to application 113, executing on user device 110 as described below. In some embodiments, user device 110 may also include physical or graphical interfaces for receiving inputs (e.g., keyboard, touchscreen, microphone, etc.) from user 105. It is noted that user device 110 is depicted as a singular device for purposes of illustration, rather than by way of limitation, and, in other embodiments of system 100, user device 110 may correspond to a plurality of user devices, each associated with one user of a plurality of users (e.g., a plurality of users corresponding to user 105), communicatively coupled to data network 160 and adapted to facilitate a transaction between each user of the plurality of users and one or more TSP nodes (e.g., corresponding to TSP node 140).

According to embodiments, user 105 preferably corresponds to non-virtualized user identifier (UID) 116, which may include a name, identification number (e.g., account information, passport number, national identity number, driver's license number, social security number, etc.), biometric identifier (e.g., fingerprint, facial identification, voiceprint, etc.), passcode (e.g., PIN, secure symbol, etc.), other forms of unique identification, or combinations thereof. UID 116 of embodiments may be stored in memory 111 for use by user device 110 when communicating with data source 120, TSP node 140, and/or VMP 130. Additionally or alternatively, UID 116 may be an input into application 113 that is received from user 105 via input systems of user device 110. Application 113 of embodiments may be software that provides user device 110 with communicative access to one or more VMPs (e.g., corresponding to one or more of VMP 130) and/or data sources (e.g., corresponding to one or more of data source 120). In some embodiments, application 113 may be operationally associated with a corresponding application at VMP 130 (e.g., application 187, discussed below). For example, the corresponding application of VMP 130 may facilitate direction communication (e.g., VIC sharing, digital consent via an authentication session, etc.) with application 113 of user device 110.

In operation according to embodiments, memory 111 may further store transaction record 112. Transaction record 112 preferably contains record entries that each catalog a relationship between VIC 115 (i.e., a Virtual ID Chain) and associated transaction log 114. For example, each entry of transaction record 112 may correspond to a separate transaction (e.g., a past transaction involving user 105, a current transaction engaged in by user 105, etc.) and includes a VIC (e.g., corresponding to VIC 115) and a transaction log (e.g., corresponding to transaction log 114) corresponding to the transaction of that entry. Transaction record 112 is preferably stored in memory 111 in a manner that is accessible by application 113 to facilitate operations discussed herein (e.g., communication between application 113 of user device 110 and application 187 of VMP 130, as discussed below).

Transaction log 114 of embodiments may describe a transaction between user 105 and TSP node 140 and may include, for example, the date and/or time of the transaction, information regarding the substance of the transaction (e.g., product, service, cost, etc.), verification information (e.g., authorization signature, confirmation symbols, etc.), other information relevant to the transaction and suitable for operations described herein, or combinations thereof. For example, user 105 may be purchasing a product in a transaction with TSP node 140, and transaction log 114 may describe the product purchased, the price of the product, an identifier associated with TSP node 140, and the time and date of the transaction. In another example, user 105 may be seeking medical services in a transaction with TSP node 140, and transaction log 114 may describe the type of service (e.g., medical code, physician notes, etc.) and the cost of the service. In some embodiments, the information in transaction log 114 may correspond to the transaction logs of other nodes involved in a transaction with user device 110 (e.g., one or more of transaction log 124 of data source 120, transaction log 134 of VMP 130, transaction log 144 of TSP node 140).

VIC 115 of embodiments preferably contains at least two VIDs representing a communication path between nodes (e.g., user device 110, data source 120, VMP 130, TSP node 140, etc.) involved in a transaction and facilitates identification of such nodes. For example, VIC 115 may include at least a virtualized identifier (e.g., VUID) corresponding to user device 110 and virtualized identifier (e.g., VSID) corresponding to data source 120 (e.g., VIC=[VUID, VSID]).

In some embodiments, VIC 115 and/or transaction log 114 may be received from data source 120 and/or VMP 130. For example, VMP 130 may transmit VICs and/or transaction logs (e.g., corresponding to VIC 135 and transaction log 134 of VMP 130) to user device 110 for cataloging in transaction record 112 simultaneous to or subsequent to transmission of the same to TSP node 140, as discussed below. In this example, VIC 115 may include one or more virtualized VMP identifiers (e.g., VMPIDs) in additional to a VUID and a VSID. In another example involving operations discussed in detail below, a VMP (e.g., corresponding to VMP 130) may receive a VUID and an non-virtualized data source identifier (e.g., SID) from data source 120, generate a virtualized data source identifier (e.g., VSID) from the SID, generate a VIC based on the VUID and VSID, and transmit the VIC to data source 120 to be relayed to user device 110 for storage as VIC 115. Accordingly, user device 110 may update VIC 115 and/or transaction log 114 based on receipt of VICs and/or transaction logs from VMP 130. Additionally or alternatively, transaction log 114 may be generated by user device 110 and may correspond to transaction information included in service request 118 associated with a transaction initiated by user 105, as discussed below.

In operation according to embodiments, user device 110 may transmit service request 118 to initiate a transaction on behalf of user 105 with TSP node 140. Service request 118 of embodiments may identify user 105 (e.g., using UID 116), identify a data source as having information relevant to the transaction (e.g., corresponding to data source 120), provide information descriptive of the transaction (e.g., corresponding transaction log 114), identify one or more VMPs (e.g., corresponding to VMP 130) with which user device 110 may be associated using application 113, or combinations thereof. For example, service request 118 may include a non-virtualized identifier associated with a bank (e.g., data source 120) to identify a payment source for a purchase transaction between user 105 and an online merchant (e.g., TSP node 140). User device 110 may transmit service request 118 to VMP 130, data source 120, TSP node 140, or combinations thereof to facilitate the transaction. For example, user device 110 may directly transmit service request 118 to TSP node 140 to facilitate a transaction on behalf of user 105 to purchase a product from TSP node 140. In another example, user device 110 may indirectly transmit service request 118 to TSP node 140 via an intermediary node (e.g., one or more of data source 120, VMP 130, etc.).

Additionally, user device 110 of embodiments may transmit user 105's digital consent to sharing associated identifiers (e.g., non-virtualized identifiers corresponding to UID 116, virtualized identifiers corresponding to VUID 117 and/or VIC 115, etc.) to one or more of data source 120, VMP 130, and TSP node 140, as discussed in further detail below. According to embodiments, digital consent may, for example, be expressed by a digital signature, browse-wrap or click-wrap agreements (e.g., via application 113, embedded in service requests discussed herein, etc.), confirmation responses (e.g., email, via application 113) during communications with data source 120 and/or VMP 130 (e.g., authentication session 125, etc.), other forms by which user 105 may express consent, or combinations thereof. For example, user device 110 may transmit user 105's consent to share UID 116 via application 113 to an associated bank (e.g., data source 120) to fund a purchase transaction with an online merchant (e.g., corresponding to TSP node 140). In some embodiments, transmittal of service request 118 by user device 110 may include user 105's consent to share UID 116. Additionally or alternatively, user device 110 may provide consent to share UID 116 via an authentication session (e.g., corresponding to authentication session 125) with data source 120 and/or VMP 130, as discussed below.

Service request 118 of embodiments may also include one or more referral tokens associated with one or more user devices (e.g., one or more devices corresponding to user device 110), each associated with a user (e.g., one or more users corresponding to user 105). For example, user 105 may include a referral token in service request 118 to obtain a discount from TSP node 140 in a purchasing transaction. In some embodiments, each of the one or more user devices may transmit a referral token (e.g., one or more referral tokens) to TSP node 140 in relation to a single service request (e.g., corresponding to service request 118).

A referral token preferably includes at least one VIC associated with a user, a cryptographic hash function (e.g., MD5; SHA-1, -2, -3; BLAKE2, RIPEMD-160, Whirlpool, etc.) of the VIC (e.g., a VIC corresponding to VIC 115), and a time stamp corresponding to creation of the referral token. For example, a referral token for a first user (e.g., $UID_p$, corresponding to user 105) may be represented as $M_p = [VUID_p, VSID_n, VVMPID_x] + Hash([VUID_p, VSID_n]) +$ timestamp, where $VSID_n$ represents a data source (e.g., corresponding to data source 120) associated with the first user and $VVMPID_x$ is a virtualized identifier corresponding to a VMP (e.g., corresponding to an instance of VMP 130) that facilitated a prior transaction on behalf of the first user. An exemplary referral token for a second user (e.g., $UID_q$, corresponding to user 105) may be represented as $M_q = [VUID_q, VSID_m, VVMPID_y] + Hash([VUID_q, VSID_m]) +$ timestamp, where $VSID_m$ represents a data source (e.g., corresponding to data source 120) associated with the second user and $VVMPID_y$ is a virtualized identifier corresponding to a VMP (e.g., corresponding to an instance of VMP 130) that facilitated a prior transaction on behalf of the second user.

Alternatively, a single, aggregated referral token may be sent to TSP node 140 by one user device on behalf of other user devices. For example, an aggregate referral token for the first and second user that may be included in a service request initiated by the first user may be represented, for example, as $M_{agg} = M_p + M_q + Hash(M_p + M_q)$. Additionally, referral tokens corresponding to one or more users (e.g., one or more users corresponding to user 105) may be used by VMP 130 to link two or more users (e.g., separate user each corresponding to user 105) together in VID Association Map 138, discussed below, by linking together one or more virtualized root identifiers (e.g., corresponding to one or more of RVID 139) associated with the one or more users.

Data source 120 of embodiments preferably includes processor 181, network interface 182, and memory 121. For example, data source 120 may include one or more servers, workstation computers, or similar devices adapted to communicate with user device 110, VMP 130, and/or TSP node 140 over data network 160. Processor 181 may include a single processor, or multiple processors, each of which may include a single processing core, multiple processing cores, or combinations thereof. In operation according to embodiments, processor 181 may be configured to perform functions as described herein (e.g., generate VIDs, store transaction records, etc.). Network interface 182 is preferably adapted to facilitate communication between data source 120 and data network 160 and may include, for example, a Bluetooth transceiver, cellular transceiver (e.g., 3G, 4G, 5G, etc.), Wi-Fi transceiver, or combinations thereof.

According to embodiments, data source 120 may be an intermediary node along a communication path across data network 160 between user device 110 and TSP node 140. Memory 121 of embodiments may include random access memory (RAM) devices, read-only memory (ROM) devices, flash memory devices, other memory devices configured to store information in a persistent or non-persistent state and suitable for operations described herein, or combinations thereof. In operation according to embodiments, memory 121 of data source 120 may store instructions that, when executed by processor 181, cause processor 181 to perform functions in accordance with the concepts described herein with respect to data source 120. For example, instructions in memory 121 may correspond to a client application associated with application 113 of user device 110 and/or application 187 of VMP 130, discussed below, that performs the functions described herein with respect to data source 120.

According to embodiments, data source 120 may be a data owner having information corresponding to user 105 relevant to a transaction between user device 110 and TSP node 140. For example, data source 120 may be one or more servers associated a bank with which user 105 has an account from which payment to an online merchant (e.g., corresponding to TSP node 140) may be drawn. Data source 120 may include financial services (e.g., checking or savings accounts, brokerage funds, health savings accounts, mortgage company, etc.), utility services (e.g., electric, gas, water, sewage, satellite, broadband, television, etc.), transportation services (e.g., airline, train, etc.), merchant services (e.g., online shopping, movie theatre, etc.), insurance services (e.g., vehicle, life, medical, etc.), governmental services (e.g., social security, department of motor vehicles, veteran affairs, etc.), other entities with information associated with user 105 suitable for operations discussed herein (e.g., employer, property title company, etc.), or combinations thereof. Additionally, data source 120 preferably corresponds to non-virtualized source identifier (SID) 126 (e.g., URL address, business registration number, mailing address, IP address, etc.), and in some embodiments, SID 126 may be stored in memory 121.

In operation according to embodiments, data source 120 may receive one or more identifiers associated with a preceding node in a communication path originating at user device 110 (e.g., UID 116 from a preceding user device 110, VIC 135 from a preceding VMP 130, etc.), information associated with a transaction log (e.g., corresponding to transaction logs of user device 110, VMP 130, or TSP node 140, respectively), and an identifier corresponding to TSP node 140, or combinations thereof to facilitate a transaction between user 105 and TSP node 140. For example, data source 120 may receive a request initiated by TSP node 140 to facilitate payment for a transaction between user device 110 and TSP node 140. In another example, data source 120 may receive a profiling request from user device 110 and/or TSP node 140 to provide information indicative of a correspondence between one or more transaction logs associated with user 105 and a specific activity profile. In some embodiments, data source 120 may receive such information from VMP 130 via data network 160. Additionally or alternatively, data source 120 may receive such information from user device 110 and/or TSP node 140.

Data source 120 is preferably adapted to generate a VID based on a non-virtualized identifier received from and identifying a preceding node in a communication path. For example, data source 120 may receive UID 116 from user device 110, and data source 120 may virtualize UID 116 as VUID 117. In some embodiments, encryption techniques may be used to generate a virtualized identifier. For example, Format Preserving Encryption (FPE) may be used to encrypt UID 116 while preserving the format of UID 116 (e.g., maintaining plaintext format instead of rendering unreadable hex code format), resulting in VUID1=FPE (UID1) (e.g., corresponding to UID 116 and VUID 117). In an additional or alternative example, VUID 117 may be encrypted from UID 116 using techniques such as Advanced Encryption Standard (AES), Triple Data Encryption Standard (3DES), RSA, Twofish, other encryption methods suitable for operations discussed herein, or combinations thereof. In other embodiments, data source 120 may generate VIDs using non-cryptographic methods, such as uniquely-assigning identifiers to provide an additional layer of abstraction, digital signatures, hash functions, other non-cryptographic methods of anonymization, or combinations thereof.

According to embodiments, data source 120 may generate a distinct VID for each subsequent transaction in which a particular non-virtualized identifier is received. For example, should data source 120 receive UID 116 in association with subsequent or additional transactions involving user 105, data source 120 virtualizes a separate instance of VUID 117 (e.g., VUID1, VUID3, VUID7, etc.) based on UID 116 (e.g., UID1) for each transaction. Data source 120 may repeatedly apply virtualization techniques to UID 116 for each transaction involving user 105 to generate a distinct of VUIDs for each of the user 105's transactions. Exemplary VUIDs representing the first to nth activities of user 105 generated using FRE techniques may be expressed as:

$$VUID1_{p,1} = FPE_p(UID_{p,1})$$
$$VUID1_{p,2} = FPE_p(VUID1_{p,1}) = FPE_p^2(UID_{p,1})$$
$$\ldots$$
$$VUID1_{p,n} =$$
$$FPR_p(VUID1_{p,n-1}) = FPE_p^2(VUID1_{p,n-2}) = \ldots = FPE_p^{n-1}(UID_{p,1})$$

Where $VID_{p,n}$ represents the virtual user ID (e.g., VUID 117) for an nth transaction involving user p (e.g., user 105); $FPE_p$ represents the Format Preserving Encryption operation for user p (e.g., using a diversified encryption key); and $UID_{p,1}$ represents the non-virtualized user ID (e.g., UID 116) of user p. Data source 120 preferably applies similar techniques to non-virtualized identifiers received from intermediary VMP nodes (e.g., corresponding to VMP 130). Examples of district virtualizations generated for each transaction are illustrated in FIG. 2A, as discussed below with respect to virtualization record 128.

In operation according to embodiments, memory 121 may further store transaction record 122 and virtualization record 128. Entries of virtualization record 128 may map a relationship between a non-virtualized identifier corresponding to a preceding node (e.g., user device 110, VMP 130, etc.) stored in transaction record 122 with each corresponding VID generated by data source 120 for the preceding node, as discussed above. For example, where a communication path associated with a transaction runs directly from user device 110 to data source 120, user device 110 is the preceding node to data source 120 and an entry in virtualization record 128 maps UID 116 to a virtualized identifier generated from UID 116 (e.g., VUID 117, as discussed above). In another example, where a communication path runs from user device 110 to data source 120 via intermediary VMP 130, VMP 130 is the preceding node to data source 120, and an entry in virtualization record maps a relationship between the non-virtualized identifier corresponding to VMP 130 (e.g., corresponding to VMPID 136, discussed below) to a virtualized identifier for VMP 130 generated by data source 120, represented as VVMPID 137. VVMPID 137 of embodiments may be generated using similar techniques as discussed above with respect to VUID 117.

In some embodiments of virtualization record 128, virtualizations corresponding to user 105 performed by data source 120 may be interspersed with VIDs generated by data source 120 for other users (e.g., one or more additional instances of user 105), as depicted in an exemplary virtualization record in FIG. 2A. Row 1 of FIG. 2A represents a first entry in virtualization record 128, with column 1 storing the UID (e.g., corresponding to UID 116) associated with a first user (e.g., corresponding to user 105) and column 2 storing at least three VUIDs (e.g., VUID1, VUID3, and VUID7, each corresponding to VUID 117) generated by data source 120 for the first user. Row 2 of FIG. 2A represents a second entry in virtualization record 128, with column 1 storing the UID (e.g., corresponding to UID 116) associated with a second user (e.g., corresponding to user 105) and column 2 storing at least three VUIDs (e.g., VUID2, VUID5, and VUID9, each corresponding to VUID 117) generated by data source 120 for the second user. Lastly, row 3 of FIG. 2A represents a third entry in virtualization record 128, with column 1 storing the UID (e.g., corresponding to UID 116) associated with a third user (e.g., corresponding to user 105) and column 2 storing at least three VUIDs (e.g., VUID4, VUID6, and VUID8, each corresponding to VUID 117) generated by data source 120 for the third user. In additional embodiments, virtualization record 128 may store the relationship between a non-virtualized identifier for a preceding node in a communication path over data network 160 and one or more VIDs associated with the same generated by data source 120. For example, where a communication path runs from user device 110 to data source 120 via intermediary VMP 130, data source 120 may virtualize VMPID 136 into VVMPID 137 and store the relationship in virtualization record 128.

Transaction record 122 of embodiments may contain record entries that each catalog an association between a VID corresponding to a preceding node in a communication path across system 100, an identifier corresponding to TSP node 140, and transaction log 124. For example, a record entry of transaction record 122 may corresponding to a separate transaction (e.g., past and current transactions involving user 105 and one or more TSP nodes corresponding to TSP node 140) catalog the relationship between VUID 117 corresponding to user 105, an identifier corresponding to TSP node 140 (e.g., TSPID 146, discussed below), and transaction log 124. In some embodiments, the identifier corresponding to TSP node 140 may be a VIC, generated according to techniques described herein, that represents a communication path originating at TSP node 140. Transaction log 124 preferably describes a transaction between user 105 and TSP node 140 and may include the date and/or time of the transaction, information regarding the substance of the transaction (e.g., product, service, cost, etc.), verification information (e.g., authorization signature, confirmation symbols, etc.), other information relevant to the transaction and suitable for operations described herein, and combinations thereof. In some embodiments, transaction log 124 may correspond to the information of transaction logs received from one or more of user device 110, VMP 130, or TSP node 140, respectively, pursuant to one or more requests discussed herein (e.g., service request 118, profiling request 152, etc.).

Data source 120 of embodiments may also be adapted to authenticate user 105 and to confirm user 105's digital consent to share identity information. Data source 120 preferably authenticates a relationship between itself and user 105 via user device 110. For example, data source 120 may be a bank with whom user 105 has an account, and data source 120 may receive and utilize UID 116 to verify user 105's identity and account information to provide funding for a purchase by user 105 at an online merchant (e.g., corresponding to TSP node 140). In another example, user device 110 may engage in a separate handshake communication (e.g., authentication session 125) between user 105 and data source 120 (e.g., two-step verification, text message and response, prompt triggered by data source 120 via VMP 130 and displayed via application 113 on user device 110, etc.) to convey user 105's consent to sharing and/or processing VICs with and for TSP node 140. Based on the authentication and consent of user 105, data source 120 of embodiments may transmit one or more of VUID 117, SID 126, and transaction log 124 to a succeeding node (e.g., depending on topology, VMP 130, TSP node 140, etc.) to facilitate the transaction between user device 110 and TSP node 140.

It is noted that data source 120 is depicted as a singular system for purposes of illustration, rather than by way of limitation, and, in other embodiments of system 100, data source 120 may include more than one data source communicatively coupled to data network 160 and adapted to facilitate transactions between user 105 and TSP node 140. For example, user 105 may need to provide both proof of employment and a down payment to a loan underwriter (e.g., TSP node 140), and a first data source may be user 105's employer and a second data source may be user 105's bank. In another example, user 105's bank (e.g., a first data source corresponding to data source 120) may provide funds to pay user 105's bill with a utility company (e.g., a first TSP corresponding to TSP node 140) in a first transaction, while the same utility company (e.g., a second data source corresponding to data source 120) may provide proof of address information to a post office (e.g., a second TSP corresponding to TSP node 140) to facilitate a delivery services for user 105. VICs of embodiments corresponding to a transaction involving two or more data sources may be generated sequentially (e.g., representing a communication path passing through a first data source and then a second data source), in parallel (e.g., representing two distinct communication paths traversing two data source), or combinations thereof.

TSP node 140 of embodiments preferably includes processor 185, network interface 186, and memory 141. Processor 185 may include a single processor, or multiple processors, each of which may include a single processing core, multiple processing cores, or combinations thereof. In operation according to embodiments, processor 185 may be configured to perform functions as described herein (e.g., initiate profiling services, initiate finalization services, etc.). Network interface 186 is preferably adapted to facilitate communication between TSP node 140 and data network 160 and may include, for example, a Bluetooth transceiver, cellular transceiver (e.g., 3G, 4G, 5G, etc.), Wi-Fi transceiver, etc.), or combinations thereof. According to embodiments, communication paths across data network 160, represented in VICs as discussed herein, may terminate at TSP node 140. Memory 141 of embodiments may include random access memory (RAM) devices, read-only memory (ROM) devices, flash memory devices, other memory devices configured to store information in a persistent or non-persistent state and suitable for operations described herein, or combinations thereof. In operation according to embodiments, memory 141 may store instructions that, when executed by processor 185, cause processor 185 to perform functions in accordance with the concepts described herein. For example, instructions in memory 141 may correspond to a client application associated with application 113 of user device 110 and/or application 187 of VMP 130, discussed below, that performs the functions described herein with respect to TSP node 140.

According to embodiments, TSP node 140 may correspond to and operate on behalf of a Third-party Service Provider (TSP) with whom user 105 engages in a transaction. For example, TSP node 140 may be one or more servers and/or terminals (e.g., mobile device, personal computer, tablet, webpage, etc.) associated with an online merchant (e.g., Amazon™, eBay™ seller, online storefront, etc.), a network-connected brick-and-mortar (e.g., gas station, movie theatre, grocery store, hospital, etc.), governmental services (e.g., state or federal tax agency, department of motor vehicles, etc.), utility services (e.g., electric, gas, satellite, broadband, television, etc.), transportation services (e.g., airline, train, etc.), other entities with whom with user 105 may engage in a transaction, or combinations thereof. TSP node 140 preferably corresponds to non-virtualized TSP identifier (TSPID) 146 (e.g., URL address, business registration number, user name, bank account, IP address, etc.), and in some embodiments, TSPID 146 may be stored in memory 141. It is noted that TSP node 140 is depicted as a singular system associated with a particular TSP for purposes of illustration, rather than by way of limitation, and, in other embodiments of system 100, TSP node 140 may include a plurality of separate and distinct processor-based systems that are each associated with a TSP, communicatively coupled to data network 160, adapted to engage in transactions with user 105 via user device 110 over data network 160.

In operation according to embodiments, memory 141 may further store transaction record 142. Transaction record 142 of embodiments may include VIC 145 and transaction log 144. Transaction log 144 preferably describes a transaction between user 105 and TSP node 140 and may include the date of the transaction, information regarding the substance of the transaction (e.g., product, service, cost, etc.), and verification information (e.g., authorization signature, confirmation symbols, etc.), other information relevant to the transaction and suitable for operations described herein, or combinations thereof. VIC 145 of embodiments may be received from VMP 130 (e.g., corresponding to VIC 135) and contains at least two VIDs representing a communication path between nodes (e.g., user device 110, data source 120, VMP 130, etc.) involved in a transaction and facilitates identification of such nodes.

In operation according to embodiments, TSP node 140 may transmit one or more requests to VMP 130 to perform data processing using the VICs discussed herein. For example, TSP node 140 may transmit processing request 150 to VMP 130 to resolve one or more VICs (e.g., one or more VICs corresponding to VIC 145), discussed below. TSP node 140 of embodiments may also transmit profiling request 152 to VMP 130 to identify whether a specific user corresponds to an activity profile of interest to TSP node 140 (e.g., corresponding to activity profile 149), as discussed below. In another example, TSP node 140 finalization request 151 to complete a transaction with user 105 (e.g., payment settlement, etc.)

VMP 130 of embodiments preferably includes processor 183, network interface 184, and memory 131. VMP 130 may include, for example, one or more servers, distributed workstations, or other processor-based systems. Processor 183 may include a single processor, or multiple processors, each of which may include a single processing core, multiple processing cores, or combinations thereof. In operation according to embodiments, processor 183 may be configured to perform functions as described herein (e.g., generate VIDs and/or VICs, resolve VIDs and/or VICs, API routing, etc.). Network interface 184 is preferably adapted to facilitate communication between VMP 130 and data network 160 and may include, for example, a Bluetooth transceiver, cellular transceiver (e.g., 3G, 4G, 5G, etc.), Wi-Fi transceiver, etc.), or combinations thereof. According to embodiments, VMP 130 may be an intermediary node along a communication path across data network 160 between user device 110 and TSP node 140, represented as a VIC as discussed herein. Memory 131 of embodiments may include random access memory (RAM) devices, read-only memory (ROM) devices, flash memory devices, other memory devices configured to store information in a persistent or non-persistent state and suitable for operations described herein, or combinations thereof.

In operation according to embodiments, memory 131 may store instructions that, when executed by processor 183, cause processor 183 to perform functions in accordance with the concepts described herein with respect to VMP 130 (e.g., generate VICs, resolve VICs, maintain transaction records, etc.). In some embodiments, the functions of VMP 130 may be performed by application 187, software executing on VMP 130 based on instructions stored in memory 131. Additionally, application 187 may provide VMP 130 with communicative access to application 113 of user device 110 to facilitate operations described herein. For example, responsive to one or more service requests from TSP node 140 (e.g., processing request 150, profiling request 152, etc.) application 187 and application 113 may engage in an authentication to verify user 105's consent to VMP 130 sharing VICs and/or transaction logs with or resolving VICs and/or transaction logs for TSP node 140.

VMP 130 of embodiments is preferably adapted to generate VIC 135 based on virtualized and non-virtualized identifiers received from preceding nodes along communication path across data network 160. According to embodiments, VIC 135 of embodiments contains at least two VIDs representing a communication path between nodes involved in the transaction (e.g., user device 110, data source 120, VMP 130, etc.) and facilitates identification of such nodes. For example, VIC=[VUID, VSID, VVMPID$_1$ . . . VVMPID$_r$] includes a sequence of virtualized identifiers corresponding to a user, a data source, and r VMPs representing the communication path of the user's activity history with respect to a service entity (e.g., merchant, government agency, etc.). In another example, VIC=[VUID, VVMPID$_1$, VSID, VVMPID$_2$ . . . VVMPID$_r$] comprises another sequence of virtualized identifiers corresponding to a user, a first VMP, a data source, and r−1 subsequent VMPs that represent the communication path of the user's activity history. VIC 135 of embodiments may be transmitted by VMP 130, along with VMPID 136, to a succeeding node (e.g., an additional VMP, a second data source corresponding to data source 120, TSP node 140, etc.).

In some embodiments, VMP 130 may receive a first VIC from a preceding node and/or a non-virtualized identifier corresponding to the preceding node. For example, VMP 130 may be a second VMP along a transaction path that receives, from a first VMP first VMP (e.g., an additional instance of VMP 130 and preceding node, transaction information (e.g., corresponding to transaction log 134 associated with the first VMP), a non-virtualized identifier (e.g., an identifier corresponding to VMPID 136) associated with the first VMP, and a first VIC (e.g., corresponding to VIC 135) generated by the first VMP. In such embodiments, VMP 130 virtualizes the identifier associated with the first VMP (e.g., resulting in a virtualized identifier corresponding to VVMPID 137) and generates VIC 135 (i.e., a second VIC). For example, VIC 135 may be generated by appending the VID associated with the first VMP to the tail of the first VIC. In another example, the first VIC and the VID associated with the first VMP may be combined using a hash function to generate VIC 135.

In additional or alternative embodiments, VMP 130 may receive a non-virtualized identifier associated with a first preceding node and a first VID associated with a second preceding node. For example, VMP 130 may receive SID 126 (e.g., corresponding to data source 120, the first preceding node) and VUID 117 (e.g., corresponding to user device 110, the second preceding node) from data source 120. VMP 130 of such embodiments may virtualize SID 126 into virtualized source identifier (VSID) 127, using cryptographic and/or non-cryptographic virtualization methods discussed above with respect to data source 120, and store the relationship between SID 126 and VSID 127 in virtualization record 132. In additional or alternative embodiments, VMP 130 may virtualize TSPID 146 into virtualized TSP identifier (VTSPID) 147 and store the relationship between TSPID 146 and VTSPID 147 in virtualization record 132. VMP 130 may also combine (e.g., using cryptographic, concatenation, hash function, etc.) VUID 117 and VSID 127 to generate a VIC and store the same as VIC 135 in association with transaction log 134 in transaction record 133.

In operation according to embodiments, memory 131 may further store virtualization record 132, transaction record 133, VID Association Map 138, or combinations thereof. Virtualization record 132 of embodiments maps non-virtualized identifiers associated with preceding nodes (e.g., corresponding to SID 126 of data source 120, VMPID 136 associated with additional VMPs, TSPID 146, etc.) with each corresponding VID (e.g., corresponding to one or more of VSID 127, VVMPID 137, VTSPID 147, etc.) that is generated therefrom by VMP 130, as discussed below. Transaction record 133 of embodiments preferably includes VIC 135 and transaction log 134. For example, each entry of transaction record 133 may correspond to a separate transaction (e.g., a past transaction involving user 105, a current transaction engaged in by user 105, etc.) and includes a VIC (e.g., corresponding to VIC 135) and a transaction log (e.g., corresponding to transaction log 134) corresponding to the transaction of that entry.

Transaction log 134 preferably describes a transaction between user 105 and TSP node 140 and may include the date and/or time of the transaction, information regarding the substance of the transaction (e.g., product, service, cost, etc.), verification information (e.g., authorization signature, confirmation symbols, etc.), other information relevant to the transaction and suitable for operations described herein, or combinations thereof. VMP 130 may receive the information of transaction log 134 (e.g., corresponding to one or more of transaction log 114, transaction log 124, transaction log 144, etc.) and identifier information (e.g., one or more of VUID 117, SID 126, TSPID 146, VMPID 136, etc.) from user device 110, data source 120, TSP node 140, or combinations thereof in relation to various requests discussed below (e.g., virtualization request 129, processing request 150, profiling request 152, etc.). Such requests may be received from user device 110, data source 120, TSP node 140, additional intermediary VMPs (e.g., an additional instance of VMP 130), or combinations thereof. VMP 130 is preferably associated with and identified by VMPID 136 (e.g., URL address, business registration number, IP address, etc.), and in some embodiments, VMPID 136 may be stored in memory 131.

In operation according to additional embodiments, VMP 130 be adapted to resolve existing VICs in response to various requests (e.g., processing request 150, profiling request 152, finalization request 151, etc.) on behalf of user 105, data source 120, TSP node 140, and/or additional VMPs, as discussed in detail below. For example, TSP node 140 may seek settlement of a transaction with user 105 virtualized in a VIC by transmitting the VIC and associated transaction log to VMP 130 to interactively resolve and retransmit via one or more VMPs (e.g., corresponding to one or more of VMP 130) until received by data source 120, as described below. In another example, TSP node 140 may request that one or more VICs be processed by VMP 130 to determine whether attributes associated with user 105 correspond to a specific profile (e.g., activity profile 149), as discussed below.

A VIC of embodiments may be resolved by iteratively decrypting the tailing VID of the VIC. For example, where VIC=[VUID, VSID, VVMPID$_1$, VVMPID$_2$], VMP 130 may resolve the VIC (e.g., corresponding to VIC 135) by decrypting VVMPID$_2$ (e.g., corresponding to VVMPID 137) to obtain VMPID$_2$ (e.g., corresponding to VMPID 136), identifying VMP$_2$, and obtaining VIC$_b$=[VUID, VSID, VVMPID$_1$], which may be transmitted to VMP$_2$ to be subsequently resolved and retransmitted to identify VMP$_1$, the data source (e.g., corresponding to data source 120) associated with the VSID, and finally the user (e.g., corresponding to user 105) associated with the VUID. In additional or alternative embodiments, a VMP 130 may resolve a VIC dereferencing the a VID of the VIC corresponding to a preceding node using virtualization record 132. For example, VMP 130 may identify a non-virtualized identifier in virtualization record 132 that is associated with a tailing VID of a VIC.

Additional embodiments of VMP 130 may develop VID Association Map 138 to represent user 105 by linking together one or more VICs corresponding to one or more transactions involving user 105. For example, TSP node 140 may be an auto insurance company requesting VMP 130 to determine whether user 105, who has applied for insurance with TSP node 140 and consented to such a determination, has a collision history. In another example, TSP node 140 may be an online merchant requesting VMP 130 to determine whether user 105's past transactions involving TSP node 140 sum to a predetermined amount. VMP 130 may use VID Association Map 138 to identify one or more VICs associated with user 105 and corresponding to transaction logs (e.g., one or more of transaction log 134) detailing auto insurance claims filed by user 105 with prior insurance carriers (e.g., corresponding to one or more of data source 120). For example, VMP 130 may link together (1) a first virtual user ID (e.g., VUID1 corresponding to VUID 117) generated for a VIC representing a first transaction involving user 105, a first data source (e.g., corresponding to data source 120), and TSP node 140; (2) a second virtual user ID (e.g., VUID3 corresponding to VUID 117) was generated for a VIC representing a second transaction involving user 105, a second data source (e.g., corresponding to data source 120), and TSP node 140; and (3) a third virtual user ID (e.g., VUID7 corresponding to VUID 117) was generated for a VIC representing a third transaction involving user 105, the first data source, and TSP node 140.

VMP 130 of embodiments preferably use a virtualized root identifier (e.g., corresponding to RVID 139) to link the virtual user IDs associated with user 105. RVID 139 associated with user 105 is preferably generated by VMP 130 using techniques discussed herein (e.g., uniquely-assigned identifier, cryptography, etc.) when a transaction involving user 105 is processed for the first time by VMP 130. Although a single VID Association Map is depicted in FIG. 1, it is for illustration only and is not limiting, and in some embodiments VMP 130 may generate one or more VID association maps (e.g., one or more maps corresponding to VID Association Map 138) corresponding to one or more users (e.g., one or more users corresponding to user 105), stores the one or more VID association maps in memory 131, and link one or more VID association maps together based on corresponding relationships between one or more users (e.g., referral tokens, etc.).

VID Association Map 138 of embodiments may also be used by VMP 130 to perform attribute profiling on corresponding transaction logs associated with user 105. For example, profiling request 152 may include a VIC (e.g., corresponding to VIC 115 received by TSP node 140 from user device 110), and VMP 130 may reference VID Association Map 138 to identify additional VICs (e.g., corresponding to VICs 135) that contain VUIDs that correspond to the user whose identity was virtualized in the VID of profiling request 152. In this context, VMP 130 preferably requests user 105's digital consent (e.g., via authentication session 125, iteratively dereferencing the additional VICs to request consent via one or more preceding nodes, etc.) before sharing the additionally identified VICs with TSP node 140. In additional embodiments, VMP 130 may use VID Association Map 138 to identify, in response to a deletion request from user device 110, one or more VICs in transaction record 133 and delete any entries associated with the identified VICs (e.g., one or more VICs corresponding VIC 135 and associated transaction log 134 from transaction record 133.

Although not depicted in FIG. 1, user device 110 may, for example, transmit, using application 113 and over data network 160, a deletion request to VMP 130 revoking consent to keep or share records (e.g., VID Association Map 138, transaction record 133, etc.) associated with user device 110. VMP 130 may receive such a request via application 187, and in turn, VMP 130 may purge VICs (e.g., one or more VICs corresponding to VIC 135) and associated transaction logs (e.g., one or more transaction logs corresponding to transaction log 134) corresponding to user 105 from transaction record 133. VMP 130 may also relay the revocation request from user device 110 to any other VMPs (e.g., associated with one or more VMPs corresponding to VMP 130) that may be identified from the VICs in transaction record 133, using techniques described herein (e.g., dereferencing VICs, etc.), as having transaction records corresponding to user device 110.

It is noted that VMP 130 is depicted in FIG. 1 as a singular element for purposes of illustration, rather than by way of limitation, and, in other embodiments of system 100, VMP 130 may include more than one VMP communicatively coupled to data network 160 and adapted to virtualize the IDs of a preceding VMP involved in facilitating the transactions between user device 110 and TSP node 140. According to embodiments, topologies involving a plurality of VMPs may be due to the limited connectivity of each respective VMP attributed to commercial arrangements (e.g., contractual relationships, etc.), territorial arrangements (e.g., service regions, international borders, etc.), technical limitations (e.g., firewalls, API implementations, system downtime, network congestion, etc.), other limitations limiting the breath of access for individual, intermediary VMP (e.g., power loss, natural disaster, etc.), or combinations thereof.

For example, a first VMP may be communicatively coupled to user device 110, a second VMP may be communicatively coupled to data source 120, and a third VMP may be communicatively to TSP node 140. The communication path corresponding to a transaction between user device 110 and TSP node 140 over such a topology may be virtualized as follows: (1) the first VMP virtualizes the identity of data source 120 and generates a first VIC that includes the virtualized identifiers for user 105 and data source 120 (e.g., $VIC_1$=[VUID, VSID]); (2) the second VMP virtualizes the identity of the first VMP and generates a second VIC by appending the VID of the first VMP to the first VIC (e.g., $VIC_2$=[VUID, VSID, $VVMPID_1$]); and (3) the third VMP virtualizes the identity of the second VMP into a VID and generates a third VIC by appending the VID of the second VMP to the second VIC (e.g., $VIC_3$=[VUID, VSID, $VVMPID_1$, $VVMPID_2$]).

In another example, a first VMP may be communicatively coupled to user device 110, a second VMP may be communicatively coupled to data source 120, and a third VMP may be communicatively to TSP node 140. A communication path corresponding to a transaction between user device 110 and TSP node 140 over such a topology may be virtualized as follows: (1) the first VMP (e.g., VMP1 corresponding to VMP 130) relays the non-virtualized identifier of user 105 to data source 120, and data source 120 virtualizes user 105's identifier; (2) the second VMP (e.g., VMP2 corresponding to VMP 130) may virtualize the identity of data source 120 and generates a first VIC that includes the virtualized identifiers for user 105 and data source 120 (e.g., $VIC_1$=[VUID, VSID]); (3) the third VMP (e.g., VMP3 corresponding to VMP 130) may virtualize the identity of the second VMP and generates a second VIC by appending the VID of the second VMP to the first VIC (e.g., $VIC_2$=[VUID, VSID, $VVMPID_2$]); and (4) the first VMP (e.g., VMP1) may virtualize the identity of the second VMP (e.g., $VVMPID_2'$ different from $VVMPID_2$ generated by the third VMP) and generates a third VIC by appending the VID of the second VMP to the first VIC (e.g., $VIC_2$=[VUID, VSID, $VVMPID_2'$]). In these examples, the first, second, and third VMPs may be communicatively coupled to each other, directly or indirectly (e.g., sequential, mesh, etc.), but each VMP might not be communicatively coupled to each of user device 110, data source 120, and TSP node 140. Accordingly, the first, second, and third VMPs may transmit VICs to each other in order to facilitate transactions between user 105 and TSP node 140.

In operation according to embodiments of system 100, user device 110 may initiate a transaction with TSP node 140 by transmitting service request 118 to TSP node 140 over data network 160. For example, user 105 may be seeking to pay for a purchase from an online storefront (e.g., corresponding to TSP node 140) with funds located at a bank (e.g., corresponding to data source 120), and user 105 may provide the storefront with the name of the bank (e.g., corresponding to SID 126) and an associated account number (e.g., UID 116). In another example, user. 105 may seek to use insurance coverage (e.g., provided by an insurance company corresponding to data source 120) to pay for services at a hospital (e.g., TSP node 140) by providing the hospital with the name of an insurance carrier (e.g., corresponding to data source 120 and SID 126) and a policy number (e.g., corresponding to UID 116).

In response to receiving service request 118, TSP node 140 may transmit processing request 150 to data source 120 over data network 160, by way of VMP 130 as an intermediary. In some embodiments, there may be one or more VMPs (e.g., one or more of VMP 130) operating as intermediaries over data network 160 between TSP node 140 and data source 120. Additionally, TSP node 140 may store information associated with the transaction and included in service request 118 in transaction log 144 of transaction record 142.

In response to receiving processing request 150, data source 120 may communicate with user device 110 to authenticate the transaction, represented in FIG. 1 as authentication session 125. For example, where data source 120 is a bank, the bank may authenticate user 105's account number (e.g., corresponding to UID 116) with additional information (e.g., personal identification number, biometrics, signature, etc.) via authentication session 125 and confirm that user 105 has an account with data source 120 from which user 105 may provide payment to an online merchant (e.g., TSP node 140).

Additionally or alternatively, data source 20 may receive confirmation from user device 110 via authentication session 125 demonstrating user 105's consent to share identity information associated with user 105. For example, user device 110 may provide a PIN and/or password associated with user 105 and corresponding to user 105's bank account with data source 120 as representing user 105's consent to sharing and/or processing VICs with and for TSP node 140. In another example, user device 110 may engage in a separate handshake communication between user 105 and data source 120 (e.g., two-step verification, text message and response, prompt triggered by data source 120 via VMP 130 and displayed via application 113 on user device 110, etc.) to convey user 105's consent to sharing and/or processing VICs with and for TSP node 140.

After data source 120 has confirmed the identity and consent of user 105, data source 120 may generate VUID 117 based on UID 116, using cryptographic (e.g., FPE, AES, 3DES, etc.) and/or non-cryptographic techniques (e.g., uniquely-assigning identifiers, digital signatures, etc.). Data source 120 preferably maintains virtualization record 128 in memory 121, mapping UID 116 with each virtual user ID (e.g., corresponding to VUID 117) generated for and corresponding to the same. To facilitate the transaction initiated by service request 118, data source 120 of embodiments may transmit virtualization request 129 to a succeeding node (e.g., a VMP corresponding to VMP 130) along a communication path between user device 110 and TSP node 140. Virtualization request 129 may include at least VUID 117, SID 126, and transaction log 124.

Figure 2B:
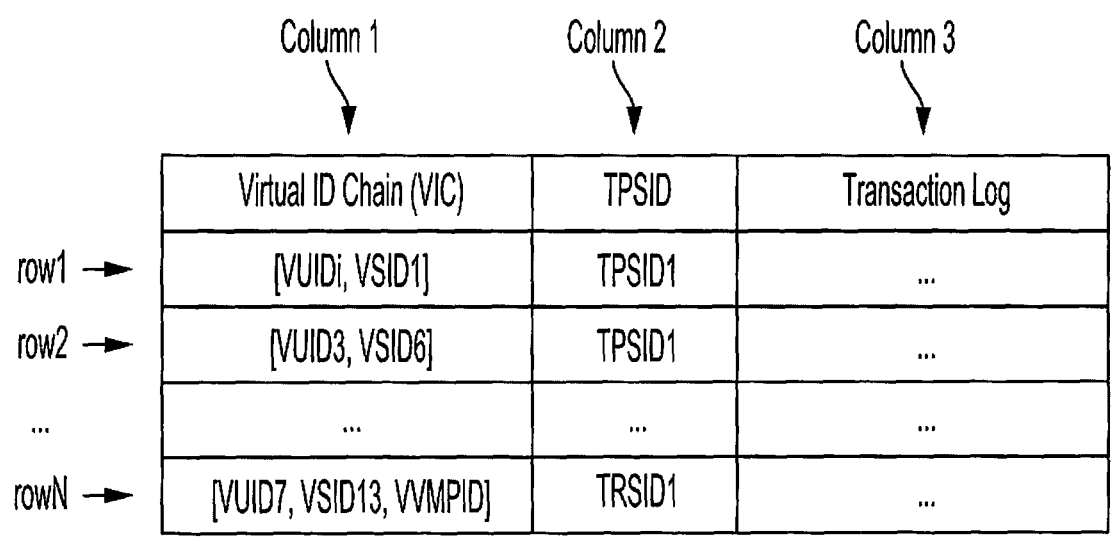

In response to receiving virtualization request 129, VMP 130 of embodiments may generate VSID 127 based on SID 126, using cryptographic (e.g., FPE, AES, 3DES, etc.) and/or non-cryptographic techniques (e.g., uniquely-assigning identifiers, digital signatures, etc.) described above. VMP 130 preferably generates a virtual ID chain (e.g., corresponding to VIC 135) based on VUID 117 and VSID 127 using processes discussed above (e.g., concatenation, hash function, etc.). In FIG. 2B, which depicts exemplary virtualization record 132, a first VIC (e.g., row 1, column 1) corresponding to VUID1 (e.g., corresponding to a first VUID 117) and VSID1 (e.g., corresponding to an instance of data source 120) may be represented as [VUID1, VSID1]. A second VIC (e.g., row 2, column 1 of FIG. 2B) corresponding to VUID3 (e.g., corresponding to a second VUID 117) and VSID5 (e.g., corresponding to an instance of data source 120) may be represented as [VUID3, VSID5]. Lastly, a third VIC (e.g., row N, column 1 of FIG. 2B) corresponding to VUID7 (e.g., corresponding to a third VUID 117), VSID13 (e.g., corresponding to an instance of data source 120), and a virtualized identifier corresponding to a preceding VMP (e.g., a second VMP from which VMP 130 received a VIC a non-virtualized identifier) may be represented as [VUID7, VSID13, VVMPID]. VMP 130 preferably stores the generated VICs (e.g., one or more of VIC 135) in virtualization record 132 with associated TSP identifiers (e.g., column 2 of FIG. 2B and corresponding to TSPID 146) and/or transaction logs (e.g., column 3 of FIG. 2B and corresponding to one or more of transaction log 134).

VMP 130 preferably transmits VIC 135 to a succeeding node (e.g., an additional VMP, a second data source corresponding to data source 120, TSP node 140, etc.) on a communication path to TSP node 140. For example, if the succeeding node is another VMP, the succeeding VMP may generate another VIC and transmits the same to another succeeding node for repeated virtualization and VIC creation until the communication path terminates at TSP node 140. In response to receiving VIC 135, TSP node 140 of embodiments may store VIC 135 in transaction record 142 as VIC 145 in association with transaction log 144. Although not shown in FIG. 1, additional or alternative embodiments of TSP node 140 may generate a virtualized identifier corresponding to VMP 130 based on VMPID 136 and store the identifiers in a virtualization record (e.g., corresponding to the functionality of virtualization records 128 and 132) in memory 141. For example, TSP node 140 may receive VIC 135, representing a transaction between user 105 and TSP node 140, and VMPID 136 from VMP 130. TSP node 140 may, in turn, virtualize VMPID 136 into VVMPID 137 and store these two identifiers in relation to one another in a virtualization record. TSP node 140 may also generate VIC 145 based on the received VIC 135 and the generated VVMPID 137 in accordance with techniques discussed herein and store VIC 145 in transaction record 142.

VMP 130 of embodiments may also transmit VIC 135 to user device 110 for storage in transaction record 112. For example, user device 110 may maintain a record of the transaction with TSP node 140 represented by VIC 135 in transaction record 112 to facilitate subsequent processing requests (e.g., profiling request 152, finalization request 151, etc.). Although not shown in FIG. 1, additional or alternative embodiments of user device 110 may generate a virtualized identifier corresponding to VMP 130 based on VMPID 136 and store the identifiers in a virtualization record (e.g., corresponding to the functionality of virtualization records 128 and 132) in memory 111. For example, user device 110 may receive VIC 135, representing a transaction between user 105 and TSP node 140, and VMPID 136 from VMP 130. User device 110 may, in turn, virtualize VMPID 136 into VVMPID 137 and store these two identifiers in relation to one another in a virtualization record in memory 111. Additionally, user device 110 may generate VIC 115 based on the received VIC 135 and the generated VVMPID 137 in accordance with techniques discussed herein and store VIC 115 in transaction record 112.

TSP node 140 of embodiments may transmit finalization request 151 to VMP 130, seeking to resolve VIC 145. Finalization request 151 may include VIC 145 and/or associated transaction log 144. In additional or alternative embodiments, finalization request 151 of embodiments may also be transmitted by TSP node 140 in response to service request 118. For example, service request 118 include one or more referral tokens associated with one or more user devices (e.g., one or more devices corresponding to user device 110), each associated with a user (e.g., one or more users corresponding to user 105). In response to receiving finalization request 151, VMP 130 of embodiments may iteratively resolve VIC 145, as discussed above, and transmit the resolved VIC to one or more preceding nodes (e.g., additional, intermediary VMPs) until received by the succeeding node to user device 110 in a communication path represented by VIC 145. For example, where user device 110 is the preceding node to data source 120, data source 120 may receive and resolve the VUID of the VIC to identify user 105 and user device 110 and finalize (e.g., execute payment, etc.) of the transaction between user 105 and TSP node 140.

In operation according to another embodiment of system 100, TSP node 140 may seek to identify whether attributes associated with user 105 correspond to activity profile 149 by transmitting profiling request 152 to VMP 130. For example, TSP node 140 may send profiling request 152 to confirm whether a transacting user (e.g., corresponding to user 105 of FIG. 1) qualifies for eligibility-based service and/or product (e.g., purchasing discount, government subsidy, food stamps, etc.). In another example, profiling request 152 may request VMP 130 identify any users (e.g., corresponding to one or more of user 105) that have transaction histories (e.g., corresponding to VICs and associated transaction logs) corresponding to activity profile 149. Profiling request 152 preferably includes activity profile 149. Activity profile 149 of embodiments may include transaction-related information corresponding to one or more transaction details associated with transaction logs (e.g., one or more of transaction log 144) of transaction record 142 for which TSP node 140 seeks to determine whether one or more users (e.g., corresponding to one or more of user 105) have corresponding transaction histories (e.g., corresponding to VICs 115 and/or 135 and associated transaction logs 114 and/or 134). For example, activity profile 149 may represent a predetermine spending total with respect to TSP node 140, and profiling request 152 may seek to determine whether the transaction amounts detailed in one or more transaction logs (e.g., one or more of transaction log 134) associated with user 105 and corresponding to past transactions involving TSP node 140 sum to the predetermined amount.

In some embodiments, activity profile 149 may be dynamically generated by TSP node 140 in association with each profiling request (e.g., separate requests corresponding to profiling request 152). Additionally or alternatively, memory 141 of TSP node 140 may store one or more activity profiles (e.g., one or more profiles corresponding to activity profile 149) that may be selectively included in profiling request 152. Profiling request 152 of embodiments may also include one or more VICs. For example, TSP node 140 may have transmitted profiling request 152 in response to a service request (e.g., corresponding to service request 118) that was initiated by user device 110 on behalf of user 105 and that includes a VUID (e.g., corresponding to VUID 117) and/or VIC (e.g., corresponding to VIC 115) corresponding to the user to demonstrate user 105's eligibility for services and/or product discounts.

In response receiving profiling request 152, VMP 130 of embodiments may use VID Association Map 138 to identify one or more VICs (e.g., one or more of VIC 135) corresponding to the user and resolve (e.g., dereference, decrypt, etc.) any such VICs (e.g., one or more of VIC 135) in transaction record 133 identified as having transaction logs (e.g., one or more of transaction log 134) that correspond to the transaction logs included in profiling request 152 (e.g., associated with activity profile 149) to identify preceding nodes (e.g., additional VMPs) set forth the VICs identifying the path to a data source (e.g., corresponding to data source 120) or user device (e.g., corresponding to user device 110). Additionally or alternatively, VMP 130 of embodiments may use virtualization record 132 as a look-up table to identify a preceding node. For example, VMP 130 may resolve VIC=[VUID1, VSID1] by consulting virtualization record 132 to determine that VSID1 (e.g., corresponding to VSID 127) was generated by VMP 130 in association with a prior transaction from SID1 (e.g., corresponding to SID 126) corresponding to data source 120. VMP 130 may transmit the resolved VICs to any additional intermediary VMPs, to iteratively resolve the VICs for retransmitting additional preceding nodes (e.g., additional, intermediary VMPs) until received by one or more succeeding nodes to user device 110 in the communication path represented by VIC 135 (e.g., corresponding to one or more of data source 120 and/or additional instances of VMP 130). In some embodiments, VMP 130 may also transmit profiling request 152 to the identified preceding nodes.

In response to receiving one or more resolved VICs, the directly succeeding node to user device 110 in the communication path may resolve the VUID set forth in the VICs (e.g., iteratively resolved from one or more of VIC 135) to identify user device 110 associated with user 105, according to processes described above. For example, where user device 110 is the preceding node to data source 120, data source 120 may receive and resolve the VUID of the VIC to identify user 105 and user device 110. Data source 120 of embodiments preferably communicates with user 105 to obtain consent to profiling. For example, data source 120 may engage in authentication session 125 with user device 110 to determine whether user 105 consents to sharing one or more VICs associated with user 105 and having associated transaction logs corresponding to activity profile 149 with TSP node 140. Upon receiving consent from user 105, data source 120 may use virtualization record 128 to identify any VUIDs corresponding to user 105 and provide such VUIDs to VMP 130.

In some embodiments, user 105 may provide digital consent to share one or more VICs associated with user 105 (e.g., corresponding to one or more of VICs 115) directly to VMP 130. Additionally, user 105 may identify for VMP 130 one or more VICs associated transaction logs corresponding to activity profile 149. For example, application 113 of user device 110 and application 187 of VMP 130 may engage in authentication session 125. During authentication session 125, user device 110 may consent to sharing one or more VICs associated with user 105 with TSP node 140. In additional embodiments, user device 110 may also identify and provide VMP 130 with one or more VUIDs associated with user 105 (e.g., corresponding to VIC 115 of transaction record 112) that have associated transaction logs (e.g., corresponding to transaction log 114) corresponding to activity profile 149. VMP 130 of embodiments may subsequently search VID Association Map 138 for all virtualization records (e.g., corresponding to virtualization record 132 comprising VIC 135 and transaction log 134) corresponding to the VUIDs associated with user 105 that correspond to activity profile 149 requested by TSP node 140. If memory 131 of VMP 130 does not includes a VID Association Map for user 105, VMP 130 preferably builds VID Association Map 138 by linking all corresponding VUIDs associated with user 105 in virtualization record 132. VMP 130 may also update existing VID Association Map 138 to include VIDs associated with user 105 (e.g., VUID 117, VSID 127 and/or VVMPID 137 set forth in VICs associated with user 105, etc.) not already included in VID Association Map 138.

Figure 3:
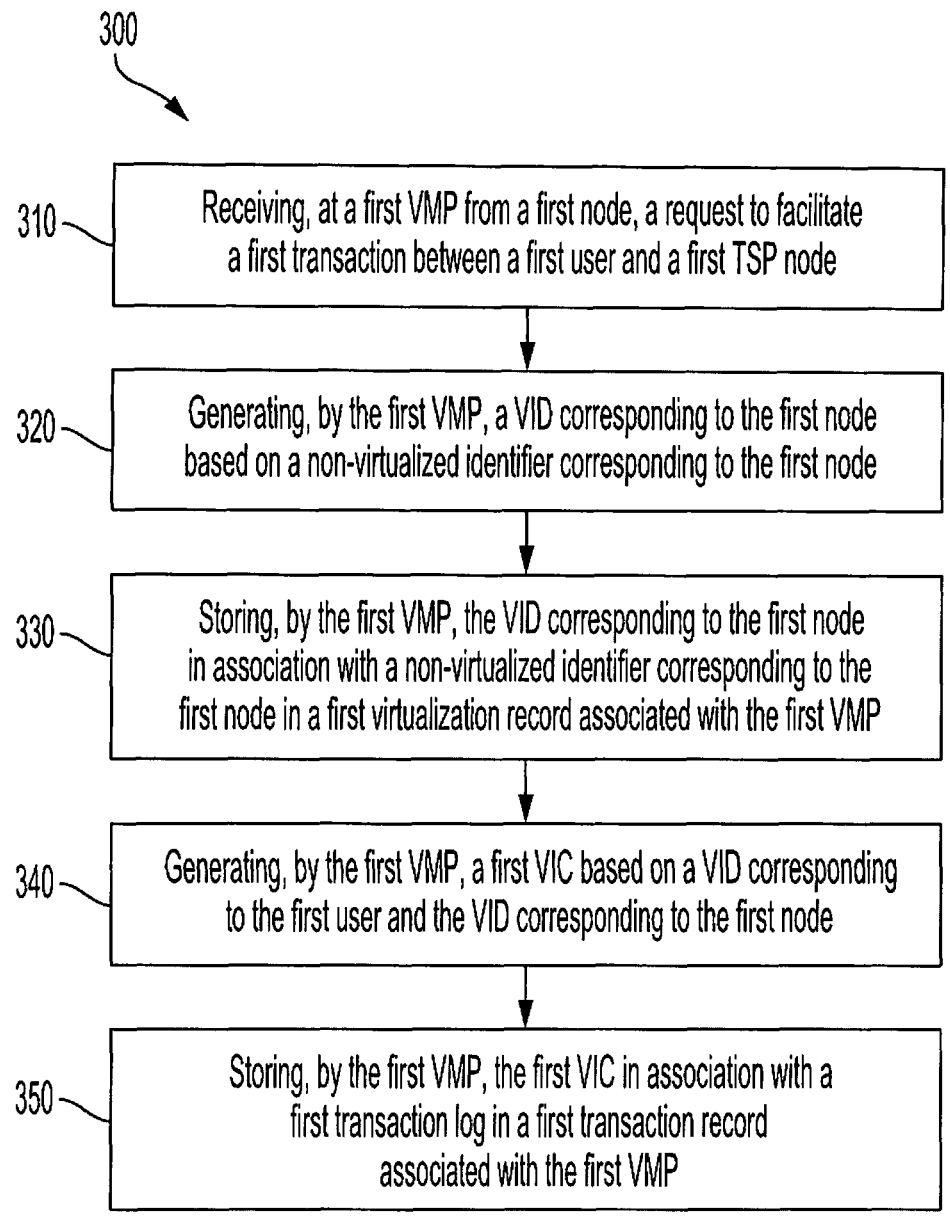
FIG. 3 illustrates a flow diagram of an exemplary method for generating a VIC in accordance with embodiments of the present invention.

Referring to FIG. 3, a flow diagram of an exemplary method for generating a VIC is shown as method 300. In an embodiment, method 300 may be performed by one more intermediary nodes (e.g., corresponding VMP 130 of FIG. 1) along a communication path corresponding to a transaction between a user and a TSP. Although embodiments are described below with to a single user (e.g., corresponding to user 105 associated with user device 110 of FIG. 1), data source (e.g., corresponding to data source 120 of FIG. 1), and TSP node (e.g., corresponding to TSP node 140), it should be appreciated that the concepts herein may likewise apply to a plurality of users, a plurality of data sources, and a plurality of TSP nodes involved in transactions between the same.

At step 310, receiving, at a first VMP (e.g., corresponding to VMP 130 of FIG. 1) from a first node, a request to facilitate a first transaction (corresponding to virtualization request 129 of FIG. 1) between a first user (e.g., corresponding to user 105 of FIG. 1) and a first TSP node (e.g., corresponding to TSP node 140 of FIG. 1). The request to facilitate the first transaction preferably includes a non-virtualized identifier (e.g., corresponding to VSID 127 or VVMPID 137 of FIG. 1) corresponding to the first node, a VID corresponding to the first user (e.g., corresponding to VUID 117 of FIG. 1), and a first transaction log (e.g., corresponding to at least one of transaction logs 114, 124, 134 of FIG. 1) corresponding to the first transaction. According to embodiments, the VID corresponding to the first user is generated by a first data source node (e.g., corresponding to data source 120 of FIG. 1) associated with the first user and is configured to resolve to provide a non-virtualized identifier corresponding to the first user (e.g., corresponding to UID 116 of FIG. 1).

The first node of embodiments may be communicatively coupled to the first VMP. In some embodiments, the first node is the first data source node, and the first data source node is communicatively coupled to a user device (e.g., corresponding to user device 110 of FIG. 1) associated with the first user. The VID of embodiments corresponding to the first user may be generated by the first data source node based on the non-virtualized identifier corresponding to the first user which the first data source node may receive from the user device associated with the first user. In additional embodiments, the first node may be an additional VMP (e.g., corresponding to an additional instance of VMP 130 of FIG. 1) communicatively coupled to the first data source. After step 310, method 300 may proceed to step 320.

At step 320, generating, by the first VMP, a VID corresponding to the first node based on the non-virtualized identifier corresponding to the first node. The VID of embodiments corresponding to the first node is preferably configured to resolve to provide the non-virtualized identifier corresponding to the first node. The VID corresponding to the first node may be generated by encrypting the non-virtualized identifier corresponding to the first node. Additional or alternatively, the VID corresponding to the first node may be generated using non-cryptographic techniques discussed herein.

In some embodiments, the first VMP may receive, from a communicatively coupled second node, a request to facilitate a second transaction (e.g., corresponding to a second instance of virtualization request 129 of FIG. 1) between a second user (e.g., corresponding to user 105 of FIG. 1) and a second TSP (e.g., corresponding to TSP node 140 of FIG. 1). The request to facilitate the second transaction preferably includes a VID corresponding to the second user (e.g., corresponding to VUID 117 of FIG. 1), a non-virtualized identifier corresponding to the second node, and a second transaction log (e.g., corresponding to at least one of transaction logs 114, 124, 134 of FIG. 1) corresponding to the second transaction. According to embodiments, the VID corresponding to the second user is generated by a second data source node (e.g., corresponding to data source 120 of FIG. 1) associated with the second user and is configured to resolve to provide a non-virtualized identifier corresponding to the second user (e.g., corresponding to UID 116 of FIG. 1).

The non-virtualized identifier corresponding to the second user is preferably distinct from the non-virtualized identifier corresponding to the first user. In some embodiments, the first node may be distinct from the second node. Additionally or alternatively, the second user may be the first user, however, the VID corresponding to the first user is preferably distinct from the VID corresponding to the second user. Even where the first user and the second user are the same user, the first TSP node may be distinct from the second TSP node. After step 320, method 300 may proceed to step 330.

At step 330, storing, by the first VMP, the VID corresponding to the first node in association with the non-virtualized identifier corresponding to the first node in a first virtualization record (e.g., corresponding to virtualization record 132 of FIG. 1) associated with the first VMP. In embodiments involving a request to facilitate a second transaction, the first VMP node may also store the relationship between the non-virtualized identifier corresponding to the second node and the corresponding VID generated by the first VMP based on the same in the first virtualization record. After step 330, method 300 may proceed to step 340.

At step 340, generating, by the first VMP, a first VIC (e.g., corresponding to VIC 135 of FIG. 1) based on the VID corresponding to the first user (e.g., corresponding to VUID 117 of FIG. 1) and the VID corresponding to the first node (e.g., corresponding to VSID 127 of FIG. 1). The first VIC is preferably configured to resolve to provide the first VID corresponding to the first user and the non-virtualized identifier corresponding to the first node. In some embodiments, the first VIC may be generated by combining the VID corresponding to the first user and the VID corresponding to the first node. As such, first VID corresponding to the first user and the VID corresponding to the first node.

The first VMP of embodiments may also receive a request to resolve the first VIC (e.g., corresponding to processing request 150 or profiling request 152 of FIG. 1), and the first VMP is preferably adapted to resolve the first VIC, according to operations described herein with respect to FIG. 1, to obtain the non-virtualized identifier corresponding to the first node. In additional embodiments where the first VMP receives a request to facilitate a second transaction (e.g., corresponding to a second instance of virtualization request 129 of FIG. 1) from a second node, the first VMP may generate a second VIC (e.g., corresponding to VIC 135 of FIG. 1) based on the VID corresponding to the second user and the VID corresponding to the second node. The second VIC is likewise preferably configured to resolve to provide the non-virtualized identifier corresponding to the second node. After step 340, method 300 may proceed to step 350.

At step 350, storing, by the first VMP, the first VIC in association with the first transaction log in a first transaction record (e.g., corresponding to transaction record 133 of FIG. 1) associated with the first VMP. In some embodiments, the first VMP may transmit the first VIC, a non-virtualized identifier corresponding to the first VMP (e.g., corresponding to VMPID 136 of FIG. 1), and the first transaction log to the TSP node (e.g., corresponding to TSP node 140 of FIG. 1) involved in the first transaction, and the TSP node may store the first VIC in association with the first transaction log in a second transaction record (e.g., corresponding to transaction record 142 of FIG. 1).

In additional or alternative embodiments, the first VMP may transmit the first VIC, a non-virtualized identifier corresponding to the first VMP (e.g., corresponding to VMPID 136 of FIG. 1), and the first transaction log to a second VMP (e.g., corresponding to a second instance of VMP 130 of FIG. 1) that is preferably is adapted to (1) generate a VID corresponding to the first VMP (e.g., corresponding to VVMPID 137 corresponding to the second instance of VMP 130 of FIG. 1) based on the non-virtualized identifier corresponding to the first VMP (e.g., corresponding to VMPID 136 corresponding to the second instance of VMP 130 of FIG. 1); (2) generate a second VIC (e.g., corresponding to VIC 135 corresponding to the second instance of VMP 130 of FIG. 1) based on the first VIC and the VID corresponding to the first VMP; (3) store the second VIC in association with the first transaction log in a second transaction record (e.g., corresponding to transaction record 133 of the second instance of VMP 130 of FIG. 1); and (4) transmit the second VIC, a non-virtualized identifier corresponding to the second VMP (e.g., corresponding to the VMPID 136 associated with the second instance of VMP 130 of FIG. 1) to a third node (e.g., corresponding to TSP node 140 or yet another instance of VMP 130 of FIG. 1). In additional embodiments, the first VMP may generate a VID Association Map (e.g., corresponding to VID Association Map 138 of FIG. 1) to link one or more VICs corresponding to the first user generated by the first VMP.

Figure 4:
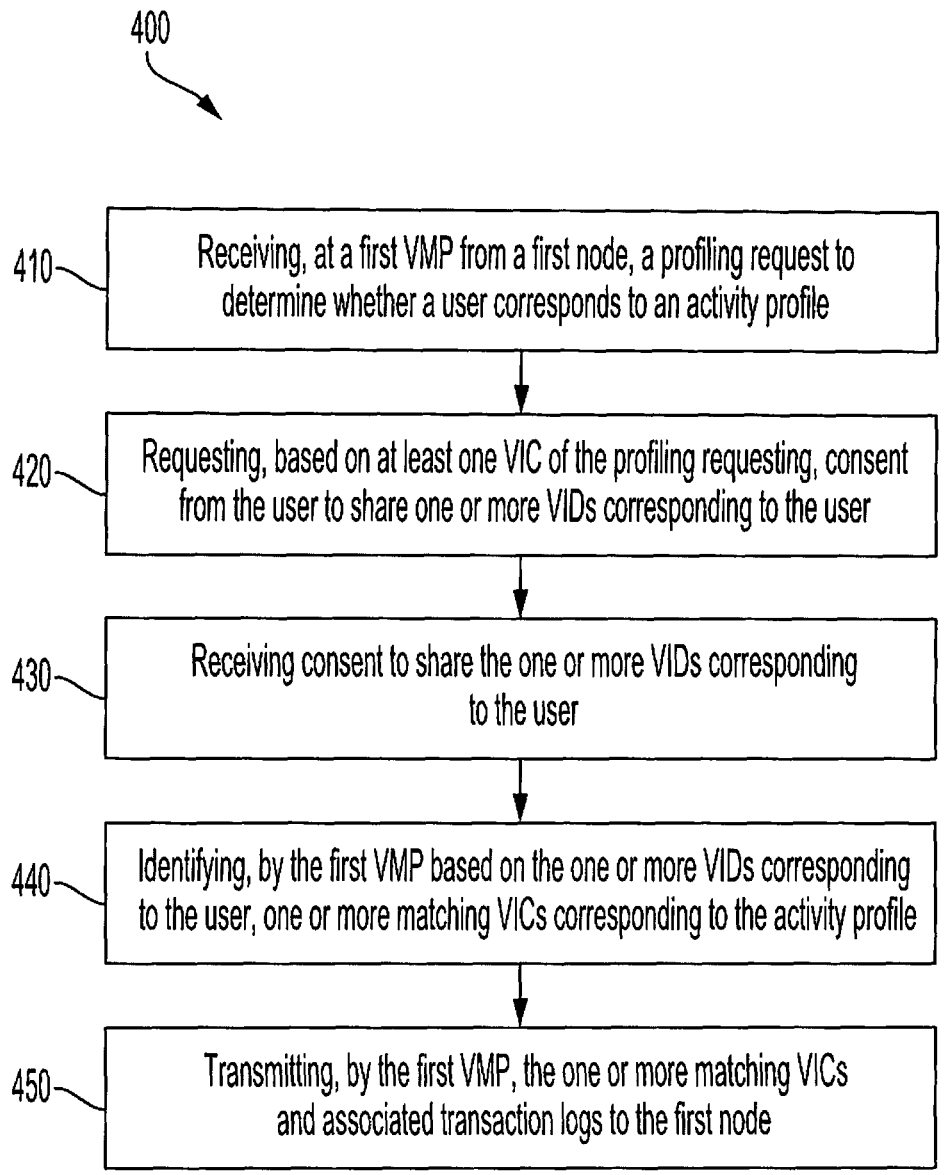
FIG. 4 illustrates a flow diagram of an exemplary profiling method using a VIC in accordance with embodiments of the present invention.

Referring to FIG. 4, a flow diagram of an exemplary method for permission-based profiling using a VIC is shown as method 400. In an embodiment, method 400 may be performed by one or more intermediary nodes (e.g., corresponding to VMP 130 of FIG. 1). Although embodiments are described below with to a single user (e.g., corresponding to user 105 associated with user device 110 of FIG. 1), data source (e.g., corresponding to data source 120 of FIG. 1), and TSP node (e.g., corresponding to TSP node 140), it should be appreciated that the concepts herein may likewise apply to a plurality of users, a plurality of data sources, and a plurality of TSP nodes involved in transactions between the same.

At step 410, receiving, at a first VMP from a first node, a profiling request (e.g., corresponding to profiling request 152 of FIG. 1) to determine whether a user (e.g., corresponding to user 105 of FIG. 1) corresponds to an activity profile (e.g., corresponding to activity profile 149 of FIG. 1). For example, the profiling request may have been sent by a TSP node (e.g., corresponding to TSP node 140 of FIG. 1) to confirm whether a transacting user's (e.g., corresponding to user 105 of FIG. 1) purchasing history meets or exceeds a predetermined amount to qualify for eligibility-based service and/or product from the TSP node (e.g., purchasing discount). In another example, the profiling request may seek to determine whether the user's income level is sufficiently lower to qualify for government benefits (e.g., tax rebate, government subsidy, food stamps, etc.). In yet another example, a TSP node may send the profiling request to determine whether the user has engaged in prior transactions with a competing TSP. The request preferably includes the activity profile and at least one VIC corresponding to the user (e.g., corresponding to VIC 115 and/or VIC 145 of FIG. 1) and associated with a past transaction involving the user (e.g., corresponding to a past transaction represented by VICs 115 and/or 145 of transaction records 112 and/or 142 of FIG. 1).

The activity profile of embodiments preferably includes transaction information corresponding to an active transaction between and the user and a TSP node. Additionally, the at least one VIC of the request may include a VID corresponding to the user (e.g., corresponding to VUID 117 of FIG. 1) and at least one VID (e.g., corresponding to one or more of VSID 127 and/or VVMPID 137 of FIG. 1) corresponding to one or more nodes (e.g., corresponding to data source 120 and/or additional instance of VMP 130 of FIG. 1) that facilitated the past transaction involving the user. According to embodiments, the first node sending the profiling request to the first VMP may be the TSP node involved in the active transaction with the user. In additional embodiments, the first node may be an intermediary VMP (e.g., corresponding to an additional instance of VMP 130 of FIG. 1) relaying the profiling request from the TSP node to the first VMP. After step 410, method 400 may proceed to step 420.

At step 420, requesting, based on the at least one VIC of the profiling request, consent from the user to share one or more VIDs corresponding to the user with the TSP node involved in the active transaction. In some embodiments, the consent request is transmitted by the first VMP to a user device (e.g., corresponding to user device 110 of FIG. 1) associated with the user and communicatively coupled to the first VMP (e.g., corresponding to applications 113 and 187 of FIG. 1). In additional or alternative embodiments, the consent may be requested from the user device associated with the user by via a second node (e.g., corresponding to data source 120 or an additional instance of VMP 130 of FIG. 1) identified by the first VMP. The first VMP may identify the second node by resolving the at least one VIC of the profiling request to identify the second node. In some embodiments, the at least one VIC of the profiling request may be resolved by decrypting the at least one VIC of the profiling request to obtain a non-virtualized identifier corresponding to the second node (e.g., corresponding to SID 126 or VMPID 136 of FIG. 1) and at least one residual VID (e.g., corresponding to an additional VID or VIC resulting from resolving VIC 115 or 145 of FIG. 1) of the at least one VIC of the profiling request. The first VMP may transmit the at least one residual VID resolved from the at least one VIC of the profiling request to the identified second node. The identified second node is preferably configured to resolve the at least one residual VID resolved from the at least one VIC of the profiling request.

In some embodiments, the identified second node is a data source node (e.g., corresponding to data source 120 of FIG. 1) associated with the user and communicatively coupled to a user device (e.g., corresponding to user device 110 of FIG. 1) associated with the user. The at least one residual VID resolved from the at least one VIC of the profiling request may correspond to a VID (e.g., corresponding to VUID 117 of FIG. 1) corresponding to the user and generated by the data source node. The data source node is preferably configured to request consent from the user via the user device (e.g., corresponding to authentication session 125 of FIG. 1) to share the one or more VIDs corresponding to the user with the TSP node. Additionally or alternatively, the identified second node may be another intermediary node (e.g., data source, VMP, etc. corresponding to data source 120 or VMP 130 of FIG. 1) adapted to iteratively resolve and transmit VICs according to operations described herein. After step 420, method 400 proceeds to step 430.

At step 430, receiving consent to share the one or more VIDs corresponding to the user. The received consent preferably includes the one or more VIDs corresponding to the user (e.g., corresponding to one or more of VUID 117 of FIG. 1). In some embodiments, the first VMP may receive the consent to share one or more VICs (e.g., one or more VICs corresponding to VIC 135 of FIG. 1) corresponding to the user directly from the user device (e.g., corresponding to authentication session 125 via applications 113 and 187 of FIG. 1) associated with the user. In additional or alternative embodiments, the first VMP may receive the consent via one or more intermediary data sources (e.g., one or more data sources corresponding to data source 120 of FIG. 1) and/or VMPs (e.g., one or more VMPS corresponding to VMP 130 of FIG. 1). In embodiments where consent from the user is obtained by a data source (e.g., corresponding to data source 120 via authentication session 125 of FIG. 1), the data source node is preferably configured to transmit the consent to share the one or more VIDs corresponding to the user to the first VMP. After step 430, method 400 may proceed to step 440.

At step 440, identifying, by the first VMP based on the one or more VIDs corresponding to the user of the consent, one or more matching VICs corresponding to the activity profile. According to embodiments, the one or more matching VICs corresponding to the activity profile are identified using a first transaction record (e.g., corresponding to transaction record 133 of FIG. 1) associated with the first VMP that defines the relationship between transaction logs (e.g., corresponding to one or more of transaction log 134 of FIG. 1) corresponding to one or more prior transactions processed by the first VMP and one or more associated VICs (e.g., corresponding to one or more of VIC 135 of FIG. 1). For example, the activity profile may seek to determine whether the user's total prior transactions with the TSP node exceed a predetermined amount, and the first VMP may locate one or more VICs in a transaction record corresponding to the user and having transaction logs detailing one or more past transactions with the TSP node and the amount of such transactions. The first VMP may sum the transaction amounts detailed in the transaction logs to determine whether the user's total transaction history exceed the predetermined amount of the activity profile. In another example, the first VMP may compare the user's annual income, as set forth in one or more transaction logs and associated VICs corresponding to tax forms associated with the user, with an income limit set forth in the activity profile.

In additional or alternative embodiments, the one or more matching VICs corresponding to the activity profile may be identified using a VID Association Map (e.g., corresponding to VID Association Map 138 of FIG. 1) associated with the user. The VID Association Map associated with the user preferably links together VICs corresponding to prior transactions involving the user and processed by the first VMP. For example, the first VMP may have associated with the user with a virtualized root identifier (e.g., corresponding to RVID 139 of FIG. 1) and linked together one or more VICs corresponding to the user (e.g., corresponding to one or more of VIC 135 of FIG. 1). The first VMP of embodiments may use the VID Association Map associated with the user, with reference to the received one or more VIDs corresponding to the user, to identify one or more VICs having transaction logs in the transaction record that correspond to the activity profile. After step 440, method 400 may proceed to step 450.

At step 450, transmitting, by the first VMP, the one or more matching VICs and associated transaction logs to the first node. (e.g., corresponding to another instance of VMP 130 or TSP node 140 of FIG. 1). The transmitted one or more matching VICs is preferably relayed via one or more intermediary nodes to the TSP node. According to embodiments, the transmitted one or more matching VICs may be used by the TSP node to confirm the user's eligibility for services and/or products. Additionally, the transmitted one or more matching VICs of embodiments may be used by the first VMP to update the VID Association Map (e.g., corresponding to VID Association Map 138 of FIG. 1) corresponding to the user. For example, the first VMP may identify additional VICs (e.g., corresponding to VIC 135 of FIG. 1) in its transaction record (e.g., corresponding to transaction record 133 of FIG. 1) that correspond to the one or more VIDs corresponding to the user of the consent but are not included in the VID Association Map associated with user, and the first VMP may add the additional VICs to the VIC Association Map.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for virtualizing identities associated with parties to a transaction using a Virtual ID Chain (VIC), comprising:

a first Virtual ID Management Platform (VMP) of one or more VMPs communicatively coupled to one or more data networks along a communication path corresponding to a transaction between a user and a Third-Party Service Provider (TSP) node, wherein a first non-virtualized VMP identifier (VMPID) corresponds to the first VMP, wherein the first VMP is configured to provide traceable virtual identification that anonymizes an identity of one or more parties to transactions to facilitate the transactions, and wherein the first VMP comprises memory and at least one processor configured to:

receive, from a data source node communicatively coupled to the one or more data networks, a virtualization request to facilitate the transaction between the user and the TSP node, wherein the virtualization request includes a Virtual ID (VID) corresponding to the user, a non-virtualized source identifier corresponding to the data source node (SID), and a transaction log corresponding to the transaction between the user and the TSP node, wherein the data source node has information associated with the user and corresponding to the transaction, wherein the VID corresponding to the user is generated by the data source node based on a non-virtualized user identifier corresponding to the user (UID), wherein the VID corresponding to the user is configured to resolve to provide the UID, wherein the TSP node is communicatively coupled to the one or more data networks, and wherein a non-virtualized TSP identifier (TSPID) corresponds to the TSP node;

generate a VID corresponding to the data source node based on the SID, wherein the VID corresponding to the data source node is configured to resolve to provide the SID;

store the VID corresponding to the data source node in association with the SID in a first virtualization record associated with the first VMP;

generate a first Virtual ID Chain (VIC) based on the VID corresponding to the user and the VID corresponding to the data source node, wherein the first VIC is configured to resolve to provide the VID corresponding to the user and the SID corresponding to the data source node represented in the VIC and enable resolving UID from the VID corresponding to the user;

store the first VIC in association with the transaction log in a first transaction record associated with the first VMP, transmit the first VIC, the first VMPID, and the transaction log to a second VMP of the one or more VMPs or to the TSP node, receive the first VIC from the second VMP or the TSP node in association with a processing request made by the TSP node, resolve the first VIC to provide the SID corresponding to the data source node represented in the first VIC, and transmit the processing request to the data source node corresponding to the SID and enable completion of the transaction without the UID of the user having been provided to the TSP node.

2. The system of claim 1, wherein the UID is received by the data source node from a user device associated with the user over the one or more data networks.

3. The system of claim 1,
wherein the TSP node is configured to store the first VIC in association with the transaction log in a second transaction record associated with the TSP node.

4. The system of claim 1,
wherein a second VMPID corresponds to the second VMP, and wherein the second VMP is configured to:
generate a VID corresponding to the first VMP based on the first VMPID, wherein the VID corresponding to the first VMP is configured to resolve to provide the first VMPID,
store the VID corresponding to the first VMP in association with the first VMPID in a second virtualization record associated with the second VMP,
generate a second VIC based on the VID corresponding to the first VMP and the first VIC, wherein the first VIC is configured to resolve to provide the VID corresponding to the first VMP and the first VIC,
store the second VIC in association with the transaction log in a second transaction record associated with the second VMP,
transmit the second VIC, the second VMPID, and the transaction log to a third VMP of the one or more VMPs or to the TSP node,
receive the second VIC from the third VMP or the TSP node in association with the processing request made by the TSP node, and
resolve the second VIC to provide the first VMPID corresponding to the first VMP represented in the second VIC.

5. The system of claim 4,
wherein the TSP node is configured to store the second VIC in association with the transaction log in a third transaction record associated with the TSP node.

6. A method for anonymizing identities associated with parties to a transaction, comprising:
receiving, at a first Virtual ID Management Platform (VMP) from a first node, a virtualization request to facilitate a first transaction between a first user and a first Third-party Service Provider (TSP) node, wherein the first VMP is configured to provide traceable virtual identification that anonymizes an identity of one or more parties to transactions to facilitate the transactions, wherein the virtualization request to facilitate the first transaction comprises a non-virtualized identifier corresponding to the first node, a Virtual ID (VID) corresponding to the first user, and a first transaction log corresponding to the first transaction, wherein the VID corresponding to the first user is generated by a first data source node associated with the first user, wherein the VID corresponding to the first user is configured to resolve to provide a non-virtualized identifier corresponding to the first user, and wherein the first node is communicatively coupled to the first VMP;

generating, by the first VMP, a VID corresponding to the first node based on the non-virtualized identifier corresponding to the first node, wherein the VID corresponding to the first node is configured to resolve to provide the non-virtualized identifier corresponding to the first node;

storing, by the first VMP, the VID corresponding to the first node in association with the non-virtualized identifier corresponding to the first node in a first virtualization record associated with the first VMP;

generating, by the first VMP, a first Virtual ID Chain (VIC) based on the VID corresponding to the first user and the VID corresponding to the first node, wherein the first VIC is configured to resolve to provide the first VID corresponding to the first user and the non-virtualized identifier corresponding to the first node and enable resolving the VID corresponding to the first user to the non-virtualized identifier corresponding to the first user;

storing, by the first VMP, the first VIC in association with the first transaction log in a first transaction record associated with the first VMP;

transmitting, by the first VMP, the first VIC, a non-virtualized VMP identifier (VMPID) corresponding to the first VMP, and the first transaction log to a second VMP or to the first TSP node;

receiving, by the first VMP, the first VIC from the second VMP or the first TSP node in association with a processing request made by the first TSP node;

resolving, by the first VMP, the first VIC to provide the non-virtualized identifier corresponding to the first node represented in the first VIC; and transmitting, by the first VMP, the processing request to the first node based on the non-virtualized identifier corresponding to the first node and enabling completion of the first transaction without the non-virtualized identifier corresponding to the first user having been provided to the first TSP node.

7. The method of claim 6, wherein the VID corresponding to the first node is generated by encrypting the non-virtualized identifier corresponding to the first node.

8. The method of claim 6, wherein the first VIC is generated by combining the VID corresponding to the first user and the VID corresponding to the first node, wherein the first VIC comprises the first VID corresponding to the first user and the VID corresponding to the first node.

9. The method of claim 6, wherein the first node is the first data source node, wherein the first data source node is communicatively coupled to a user device associated with the first user, and wherein the VID corresponding to the first user is generated by the first data source node based on the non-virtualized identifier corresponding to the first user, and wherein the non-virtualized identifier corresponding to the first user is received by the first data source node from the user device associated with the first user.

10. The method of claim 6, wherein the first VIC is stored by the first TSP node in association with the first transaction log in a second transaction record associated with the first TSP node.

11. The method of claim 6, wherein the second VMP is configured to:
generate a VID corresponding to the first VMP based on the non-virtualized identifier corresponding to the first VMP, wherein the VID corresponding to the first VMP is configured to resolve to provide the non-virtualized identifier corresponding to the first VMP,
store the VID corresponding to the first VMP in association with the non-virtualized identifier corresponding to the first VMP in a second virtualization record associated with second VMP,
generate a second VIC based on the first VIC and the VID corresponding to the first VMP, wherein the second VIC is configured to resolve to provide the first VIC and the non-virtualized identifier corresponding to the first VMP,
store the second VIC in association with the first transaction log in a second transaction record associated with the second VMP, and
transmit the second VIC, a non-virtualized identifier corresponding to the second VMP, and the first transaction log to a third node.

12. The method of claim 6, further comprising:
receiving, at the first VMP from a second node, a virtualization request to facilitate a second transaction between a second user and a second TSP node, wherein the virtualization request to facilitate the second transaction comprises a VID corresponding to the second user, a non-virtualized identifier corresponding to the second node, and a second transaction log corresponding to the second transaction, wherein the VID corresponding to the second user is generated by a second data source node associated with the second user, wherein the VID corresponding to the second user is configured to resolve to provide a non-virtualized identifier corresponding to the second user, and wherein the second node is communicatively coupled to the first VMP;

generating, by the first VMP, a VID corresponding to the second node based on the non-virtualized identifier corresponding to the second node, wherein the VID corresponding to the second node is configured to resolve to provide the non-virtualized identifier corresponding to the second node;

storing, by the first VMP, the VID corresponding to the second node in association with the non-virtualized identifier corresponding to the second node in the first virtualization record associated with the first VMP;

generating, by the first VMP, a second VIC based on the VID corresponding to the second user and the VID corresponding to the second node, wherein the second VIC is configured to resolve to provide the non-virtualized identifier corresponding to the second node and enable resolving the VID corresponding to the second user to the non-virtualized identifier corresponding to the second user;

storing, by the first VMP, the second VIC in association with the second transaction log in the first transaction record associated with the first VMP;

transmitting, by the first VMP, the second VIC, a non-virtualized VMP identifier (VMPID) corresponding to the first VMP, and the second transaction log to a third VMP or to the second TSP node;

receiving, by the first VMP, the second VIC from the third VMP or the second TSP node in association with a processing request made by the second TSP node;

resolving, by the first VMP, the second VIC to provide the non-virtualized identifier corresponding to the second node represented in the second VIC; and transmitting, by the first VMP, the processing request to the second node based on the non-virtualized identifier corresponding to the second node and enabling completion of the second transaction without the non-virtualized identifier corresponding to the second user having been provided to the second TSP node.

13. The method of claim 12, wherein the non-virtualized identifier corresponding to the first user is distinct from the non-virtualized identifier corresponding to the second user.

14. The method of claim 12, wherein the first node is distinct from the second node.

15. The method of claim 12, wherein the first TSP node is distinct from the second TSP node.

16. The method of claim 12, wherein the second user is the first user, and wherein the VID corresponding to the first user is distinct from the VID corresponding to the second user.

17. The method of claim 16, further comprising:
generating, by the first VMP, a VID association map corresponding to the first and second user, wherein the VID association map identifies a relationship between the first VIC and the second VIC.

18. The method of claim 17 wherein the relationship between the first VIC and the second VIC is identified using a virtualized root identifier corresponding to the first and second user, wherein the virtualized root identifier associated with the first and second user is generated by the first VMP and links the VID corresponding to the first user and the VID corresponding to the second user.

19. The method of claim 16, further comprising:
receiving, at the first VMP from the first TSP node, a request to resolve the first VIC, wherein the first VIC is included in the request to resolve the first VIC;

resolving, by the first VMP, the first VIC to identify the first node, wherein resolving the first VIC provides the non-virtualized identifier corresponding to the first node and the VID corresponding to the first user; and transmitting, by the first VMP based on the non-virtualized identifier corresponding to the first node, the VID corresponding to the first user to the first node.

20. The method of claim 19, wherein the request to resolve the first VIC corresponds to a profiling request to determine whether the first user corresponds to an activity profile associated with the first TSP node.

21. The method of claim 19, wherein the first VIC is resolved by decrypting the VID corresponding to the first node of the first VIC to obtain the non-virtualized identifier corresponding to the first node.

22. The method of claim 19, wherein the first node is the first data source node and is communicatively coupled to a user device associated with the first user, and wherein the first node is configured resolve the VID corresponding to the first user to obtain the non-virtualized identifier corresponding to the first user.

* * * * *